United States Patent
Marr

(10) Patent No.: US 8,364,509 B1
(45) Date of Patent: Jan. 29, 2013

(54) SYSTEMS METHODS, AND COMPUTER-READABLE MEDIA FOR GATHERING, TABULATING, AND REPORTING ON EMPLOYEE PERFORMANCE

(75) Inventor: Kenneth A. Marr, Gretna, NE (US)

(73) Assignee: West Corporation, Omaha, NE (US)

( * ) Notice: Subject to any disclaimer, the term of this patent is extended or adjusted under 35 U.S.C. 154(b) by 1992 days.

(21) Appl. No.: 10/675,935

(22) Filed: Sep. 30, 2003

(51) Int. Cl.
*G06Q 10/00* (2006.01)
*G06Q 50/00* (2006.01)
*H04M 3/00* (2006.01)
*H04M 5/00* (2006.01)

(52) U.S. Cl. ...... 705/7.11; 705/7.42; 705/320; 705/328; 329/265.06

(58) Field of Classification Search ................. 705/7.11, 705/7.42, 320, 328; 379/265.06
See application file for complete search history.

(56) References Cited

U.S. PATENT DOCUMENTS

| | | | | |
|---|---|---|---|---|
| 3,460,270 | A * | 8/1969 | Black et al. .................. 434/228 |
| 5,297,280 | A * | 3/1994 | Potts et al. .......................... 707/5 |
| 5,499,291 | A | 3/1996 | Kepley |
| 5,621,789 | A * | 4/1997 | McCalmont et al. .... 379/265.06 |
| 5,862,325 | A | 1/1999 | Reed et al. |
| 6,049,779 | A | 4/2000 | Berkson |
| 6,058,163 | A | 5/2000 | Pattison |
| 6,115,693 | A | 9/2000 | McDonough et al. |
| 6,289,382 | B1 * | 9/2001 | Bowman-Amuah .......... 709/226 |
| 6,314,177 | B1 | 11/2001 | Davis |
| 6,347,139 | B1 | 2/2002 | Fisher |
| 6,359,982 | B1 | 3/2002 | Foster |
| 6,363,346 | B1 * | 3/2002 | Walters ......................... 704/231 |
| 6,392,666 | B1 | 5/2002 | Hong |
| 6,453,038 | B1 | 9/2002 | McFarlane |
| 6,459,787 | B2 | 10/2002 | McIllwaine |
| 7,203,655 | B2 * | 4/2007 | Herbert et al. .................. 705/11 |
| 7,249,051 | B1 * | 7/2007 | Jenniges et al. ........... 705/14.13 |

(Continued)

FOREIGN PATENT DOCUMENTS

| JP | 06-336150 | 12/1994 |
|---|---|---|
| JP | 07-223568 | 8/1995 |

(Continued)

OTHER PUBLICATIONS

Gene Wilburn (Sep. 15, 1994). An intermediate data organizer :[MET Edition]. Toronto Star,(B) p. G7. Retrieved Jan. 4, 2008, from Business Dateline database. (Document ID: 518240241).*

(Continued)

*Primary Examiner* — Peter Choi
*Assistant Examiner* — Folashade Anderson

(57) ABSTRACT

Systems, methods, and computer readable media for reporting on at least one aspect of respective performance of a plurality of agents. The methods can include receiving data representing respective performance parameters that pertain to the agents, storing the data for subsequent query and retrieval, receiving at least one query, retrieving at least some of the data in response to the query, and presenting at least one result of the query to the at least one user. Other aspects of the method enable management or supervisors to access data pertaining to teams or groups of agents, and drill-down to access data specific to the agents that comprise the various teams or groups. Systems and computer readable media are provided for practicing various aspects of the method.

88 Claims, 28 Drawing Sheets

U.S. PATENT DOCUMENTS

| | | | |
|---|---|---|---|
| 7,483,842 | B1* | 1/2009 | Fung et al. ............... 705/11 |
| 2002/0184085 | A1* | 12/2002 | Lindia et al. ............. 705/11 |
| 2004/0030566 | A1* | 2/2004 | Brooks Rix ............... 705/1 |
| 2004/0088177 | A1* | 5/2004 | Travis et al. ............. 705/1 |
| 2004/0210661 | A1* | 10/2004 | Thompson ............... 709/228 |
| 2007/0198284 | A1* | 8/2007 | Korenblit et al. ........ 705/1 |

FOREIGN PATENT DOCUMENTS

| | | |
|---|---|---|
| JP | 09-324730 | 12/1997 |
| JP | 10-001079 | 1/1998 |
| JP | 2001-018754 | 1/2001 |

OTHER PUBLICATIONS

"Query." Def. 1. Microsoft Computer Dictionary. 4th ed. Redmond: Microsoft P, 1999.*

Cisco Systems, Converting Data into Business Intelligence, www.cisco.com, Oct. 17, 2002.

Cisco Systems, Expanding The Contact Center Enterprise, www.cisco.com, Oct. 17, 2002.

Digisoft, Reporting, www.digisoft.com, Oct. 17, 2002.

Intecom, Documents from www.intecom.com, Oct. 17, 2002.

* cited by examiner

Time Log

Figure 2

| Date | Id | Name | Activity | Start | Stop | Total |
|------|------|------|----------|-------|------|-------|
| 5/18/ | 1009 | HOLLIE BAUMANN | Section Leader Log | 5:55:00 PM | 6:00:00 PM | 0.0833 |
| 5/18/ | 1012 | DAVID STEIER | Section Leader Log | 1:37:00 PM | 1:44:00 PM | 0.1167 |
| 5/18/ | 1012 | DAVID STEIER | Other | 1:00:00 PM | 1:07:00 PM | 0.1167 |
| 5/18/ | 1016 | TANEISHA DAVIS | Section Leader Log | 5:00:00 PM | 5:10:00 PM | 0.1667 |
| 5/18/ | 1016 | TANEISHA DAVIS | Section Leader Log | 10:36:00 AM | 10:39:00 AM | 0.05 |
| 5/18/ | 1016 | TANEISHA DAVIS | Other | 8:30:00 AM | 8:37:00 AM | 0.1167 |
| 5/18/ | 1022 | AUBREE MOORE | Section Leader Log | 3:44:00 PM | 3:48:00 PM | 0.0667 |
| 5/18/ | 1027 | ALAN DUNKLAU | Section Leader Log | 12:07:00 PM | 12:14:00 PM | 0.1167 |
| 5/18/ | 1027 | ALAN DUNKLAU | Other | 11:30:00 AM | 11:40:00 AM | 0.1667 |
| 5/18/ | 1037 | JENNIFER KREUTZTRAGER | Section Leader Log | 8:30:00 AM | 8:37:00 AM | 0.1167 |
| 5/18/ | 1037 | JENNIFER KREUTZTRAGER | Section Leader Log | 9:46:00 AM | 9:53:00 AM | 0.1167 |
| 5/18/ | 1048 | JANICE MASON | Section Leader Log | 7:37:00 AM | 7:41:00 AM | 0.0667 |
| 5/18/ | 1048 | JANICE MASON | Other | 6:00:00 AM | 6:07:00 AM | 0.1167 |
| 5/18/ | 1108 | VICTOR MARTINEZ | Section Leader Log | 7:30:00 AM | 7:37:00 AM | 0.1167 |
| 5/18/ | 1108 | VICTOR MARTINEZ | Other | 12:00:00 PM | 12:15:00 PM | 0.25 |
| 5/18/ | 1109 | NIA WILLIAMS | Section Leader Log | 9:30:00 AM | 9:37:00 AM | 0.1167 |
| 5/18/ | 1126 | JASON STARK | Section Leader Log | 9:50:00 AM | 10:00:00 AM | 0.1667 |
| 5/18/ | 1126 | JASON STARK | Other | 8:30:00 AM | 8:37:00 AM | 0.1167 |
| 5/18/ | 1144 | SAMANTHA ARNOLD | Section Leader Log | 11:26:00 AM | 11:30:00 AM | 0.0667 |
| 5/18/ | 1144 | SAMANTHA ARNOLD | Section Leader Log | 10:19:00 AM | 10:23:00 AM | 0.0667 |
| 5/18/ | 1147 | KRISTINE TOLER | Section Leader Log | 7:44:00 AM | 7:48:00 AM | 0.0667 |
| 5/18/ | 1147 | KRISTINE TOLER | Other | 7:00:00 AM | 7:07:00 AM | 0.1167 |
| 5/18/ | 1156 | PHILIP NEWBILL | Section Leader Log | 7:40:00 AM | 8:08:00 AM | 0.4667 |
| 5/18/ | 1156 | PHILIP NEWBILL | Section Leader Log | 11:02:00 AM | 11:19:00 AM | 0.2833 |
| 5/18/ | 1161 | CARLA CHRISTIAN | Other | 11:00:00 AM | 11:07:00 AM | 0.1167 |
| 5/18/ | 1167 | VALARIE JOHNSON | Section Leader Log | 10:43:00 AM | 10:57:00 AM | 0.2333 |
| 5/18/ | 1173 | CORRIE PICCOLO | Assist Leader | 12:26:00 PM | 2:54:28 PM | 2.4411 |
| 5/18/ | 1173 | CORRIE PICCOLO | Assist Leader | 3:06:00 PM | 4:15:37 PM | 1.1603 |
| 5/18/ | 1177 | SUSAN BOHANNON | Assist Leader | 7:46:00 AM | 12:01:20 PM | 4.2556 |
| 5/18/ | 1177 | SUSAN BOHANNON | Other | 10:10:00 AM | 10:17:00 AM | 0.1167 |
| 5/18/ | 1195 | GERALDINE SINGLETON | Section Leader Log | 10:14:00 AM | 10:19:00 AM | 0.0833 |
| 5/18/ | 1195 | GERALDINE SINGLETON | Other | 9:30:00 AM | 9:37:00 AM | 0.1167 |

Figure 3

ET Log

| Date | Id | Name | Excused Time | Total | Excused By |
|------|------|------|-------------|-------|-----------|
| 5/17 | 2814 | HINTON, CLARISSA | 16:21 - 18:00 | 1.65 | jjs |
| 5/17 | 2958 | COLLINS, SANDRA | 15:57 - 19:00 | 3.05 | JAT |
| 5/17 | 3010 | BAUTISTA, JANUARY | 18:48 - 23:00 | 4.2 | jjs |
| 5/17 | 3080 | SZAHOWSKI, JENNIFER | 20:54 - 00:00 | 3.1 | jjs |
| 5/17 | 3195 | MORGAN, RUFUS | 16:27 - 20:00 | 3.55 | jjs |
| 5/17 | 3357 | PAGE JR, EMANUEL | 16:25 - 19:00 | 2.58 | jjs |
| 5/17 | 3479 | TWINE, WILLIE | 14:30 - 18:00 | 3.5 | nwc |
| 5/17 | 3524 | FREEMAN JR, JOHNSON | 16:48 - 23:00 | 4.2 | jjs |
| 5/17 | 3651 | HARRIS, JASON | 14:20 - 18:00 | 3.67 | nwc |
| 5/17 | 3702 | MIZELLE, BERMADENE | 15:15 - 16:00 | 0.75 | jjs |
| 5/17 | 3870 | SINGLETOM, LOUISETTE | 16:22 - 23:00 | 6.63 | JAT |
| 5/17 | 4143 | MONTGOMERY, CHERYL | 14:30 - 15:30 | 1 | jjs |
| 5/17 | 4290 | MATTHEWS, AISHA | 22:15 - 01:00 | 2.75 | nwc |
| 5/17 | 4302 | SHAIFER, STEVEN | 16:24 - 20:00 | 3.6 | JAT |
| 5/17 | 4349 | ODEN, RICHARD | 15:15 - 16:00 | 2.75 | nwc |
| 5/17 | 4360 | BAGLEY, LINDA | 14:34 - 16:00 | 1.43 | nwc |
| 5/17 | 4402 | YARBROUGH, GERALDINE | 20:22 - 23:00 | 2.63 | JAT |
| 5/17 | 4595 | SAUNDERS, HELEN | 15:15 - 15:30 | 0.25 | JAT |
| 5/17 | 4595 | SAUNDERS, HELEN | 15:15 - 16:00 | 0.75 | JAT |
| 5/17 | 4659 | CULLER, SHEILA | 20:21 - 21:00 | 0.65 | jjs |
| 5/17 | 4823 | PARKER, RHONAE | 15:15 - 19:00 | 3.67 | jjs |
| 5/17 | 4981 | KILBY, WILLIAM | 15:15 - 16:00 | 0.75 | nwc |
| 5/17 | 5219 | WILLIAMS, JANICE | 15:48 - 17:30 | 1.7 | jjs |
| 5/17 | 5237 | CARTER, FELECIA | 18:45 - 22:00 | 3.18 | JAT |
| 5/17 | 5435 | JOHNSON, MARJIE | 20:49 - 00:00 | 3.25 | jjs |
| 5/17 | 5525 | DAVIS, NATASHA | 16:22 - 00:00 | 7.63 | nwc |
| 5/17 | 5567 | BOYD, MAY | 16:39 - 17:30 | 0.85 | jjs |
| 5/17 | 5769 | GAILE, FLOSSIE | 22:19 - 08:00 | 9.68 | jjs |
| 5/17 | 5779 | WAITE, SHAWN | 14:21 - 18:00 | 3.65 | jjs |
| 5/17 | 5805 | TURLEY, CHRISTINE | 20:49 - 23:00 | 2.18 | jjs |
| 5/17 | 5852 | ROPAIN, RAMON | 14:28 - 17:00 | 2.53 | jjs |
| 5/17 | 5882 | CHAVIS, DARRICK | 14:36 - 18:00 | 3.4 | nwc |
| 5/17 | 5986 | STURIDVANT, SHONDA | | | |

Figure 4

Time Log Percent

Figure 5

Agent Development System

| | | |
|---|---|---|
| USER ID: KAH6164 | NAME: {USER} | GROUP: DIRECT RESPONSE (OMAHA) |

Section One

| Position | Id | Agent Name |
|---|---|---|
| 2001 | 1918 | LOUISE GROLEAU |
| 2002 | 3221 | PAMELA MONROE |
| 2004 | 3925 | SONJA KNIESLY |
| 2005 | 2619 | THOMAS BRAY |
| 2007 | 2770 | PATRICIA LANGEL |
| 2009 | 3280 | TAMINA FORD |
| 2010 | 1127 | SUSAN BOHANNON |
| 2011 | 3556 | JANETTE BECKER |
| 2012 | 1772 | GERHARDT LEFFLER |
| 2013 | 2227 | MELISSA EDINGER |
| 2016 | 3776 | PHYLLIS SHARP |
| 2017 | 1324 | KELLIE GREGG |
| 2018 | 4565 | CHERYL CARTER |
| 2019 | 2630 | STEPHANIE COOK |
| 2020 | 2147 | SHAWNEE TURNER |
| 2029 | 2044 | LINDA STRICKER |
| 2031 | 4222 | JACK KRAHULEC |
| 2032 | 1432 | MARUFDJOM KHOLMATOV |
| | | STEPHEN MALLORY |

DIRECT RESPONSE (OMAHA)
Section One Report

For the date of: DATE

| Pos | Id | Name | Last Ann 5/14/ | Last PDM 5/7/ YR | Prod | Conv 90 | Occur | Open Assignments |
|---|---|---|---|---|---|---|---|---|
| 2001 | 1918 | LOUISE GROLEAU | 5/19/ | 5/5/ | 95.09 | 94.17 | 0 | N/A |
| 2002 | 3221 | PAMELA MONROE | 5/16/ | 5/16/ | 98.45 | 95.92 | 0.5 | N/A |
| 2004 | 3925 | SONJA KNIESLY | 5/14/ | 5/14/ | 97.14 | 95.36 | -1 | N/A |
| 2005 | 2619 | THOMAS BRAY | 5/18/ | 5/14/ | 100.76 | 93.97 | 3.5 | N/A |
| 2007 | 2770 | PATRICIA LANGEL | | | | | 4.75 | Michael Thurmond Training |
| 2009 | 3280 | TAMINA FORD | 5/14/ | 5/14/ | 115.37 | 95.04 | 4.5 | Michael Thurmond Quiz from Class |
| | | | | | | | | N/A |

Figure 6

Agent Summary

WEST CORPORATION

USER ID: LAD6164  NAME: {USER}  GROUP: DIRECT RESPONSE (OMAHA)

Information for: PAMELA MONROE(3221)  Hire Date: 5/22/ YEAR ~603

Agent Assignments

Assignment  Score ~602  Date Completed

No Records Found

Last Six Appraisals ~615

| Write date | Score ~623 | Date Issued ~619 | Appraiser |
|---|---|---|---|
| 5/1/ YR | 2.2857 | 5/19/ YR | LAUREN CHASE ~621 |
| 5/1/ | 2 | 5/10/ | GENESE CURTIS |
| 5/2/ | 2.1429 | 4/26/ | GENESE CURTIS |
| 4/28/ | 2.125 | 4/21/ | LAUREN CHASE |
| 4/21/ | 2.125 | 4/12/ | PATRICK TAYLOR |
| | | | CORRIE PICCOLO ~604 |

~605

Last Six PDMs ~617

| Write date | Date Issued ~619 | Appraiser |
|---|---|---|
| 5/3/ YR | 4/12 | GENESE CURTIS ~621 |
| 4/1/ | 3/12 | CORRIE PICCOLO |
| 4/1/ | 2/27/ | CORRIE PICCOLO |
| 4/21/ | 1/11/ | ANTHONY WASSINGER |
| 4/21/ | 9/27/ | ANTHONY WASSINGER |
| | | KENT KELLY |

~607  ~606

Occurrence Total
0.5 ~608

Last Six Weeks of Agent Performance ~622

| Start ~623 | End | Prod | Conv ~624 | Sched ~626 | ACD Calls ~628 | AHT ~630 | Talk ~632 | Hold ~634 | Wrap ~636 |
|---|---|---|---|---|---|---|---|---|---|
| 4/15/ YR | 4/21/ YR | 95.09 | 94.17 | -94.28 | 426 | 228.38 | 227.42 | 5.94 | 0.95 |
| 4/8/ | 4/14/ | 95.14 | 89.06 | 102.4 | 526 | 245.1 | 244.46 | 6.93 | 0.64 |
| 4/1/ | 4/7/ | 98.72 | 95.68 | 92.41 | 295 | 268.49 | 267.76 | 8.75 | 0.74 |
| 3/25/ | 3/31/ | 96.14 | 92.63 | 97.77 | 473 | 243.13 | 242.51 | 6 | 0.62 |
| 3/18/ | 3/24/ | 95 | 93.68 | 99.02 | 271 | 273.41 | 272.42 | 2.86 | 0.98 |
| 3/11/ | 3/17/ | 117.42 | 92.99 | 80.25 | 361 | 262.82 | 262.29 | 5.42 | 0.53 |

~638  ~610

PIN History ~612

LOG OUT

Performance Appraisal

700

DIRECT RESPONSE (OMAHA)
Performance Appraisal

Performance Score Card

Ratings
Blank   Performance category not witnessed during the appraisal.
1       Needs Improvement – Continued performance at this level could result in disciplinary action or termination
2       Satisfactory – Met expectations, performed in an acceptable manner
3       Superior – Exceeded expectations Id: 3221
Name: PAMELA MONROE
Write Date: 5/19/:YR
Product: Balance Bracelet
Tape Count:

Professional/Enthusiastic:
acknowledges caller correctly, maintains professional mannerism, sounds sincere with I'm glad you called today.   3

Conversational Scripting/Call Pace:
While presenting scripting, sounds concerned/sensitive where appropriate.   2

Willingness to assist Caller:
Makes a concerted effort to help caller by answering questions.   2

Voice Quality:
Clear proper pronunciation and enunciation, pleasant sounding.   3

Attempted to convert caller to order:

Figure 8

PDM Report

WEST CORPORATION OPERATIONS

USER ID: {CAPS114}   NAME: {USERS}   GROUP: DIRECT RESPONSE (OMAHA)

DIRECT RESPONSE (OMAHA)
PDM Report

For the date of: DATE

Id: 3221

Name: PAMELA MONROE

PDM Write Date: 5/5/YR

Build Rapport:
Thank the agent for meeting with you. Establish your agenda with the agent. Purpose is to improve performance. We will look at your current situation. We will discuss desired performance. We will build improvement steps. Is there anything else you would like to discuss today?

We will discuss desired performance. We will build improvement steps. Is there anything else you would like to discuss today

Discovery:
Ask the agent the following questions:
1. Do you know what the minimum standard is for productivity?
   What is your current productivity?
   How do you plan to improve?
2. Do you know what the minimum standard is for conversion?
   What is your current conversion?
   How do you plan to improve?
3. Do you know what are the attendance expectations?
   How many occurrences do you have?
   How do you plan to improve?

productivity 95 conversion 94 occurrences 0.5

Improvement Steps:
Please be sure and take careful notes. What can you do differently to improve your performance in this area? Why are meeting these goals important to you and West. Ask the agent to summarize back to you their

N/A

Log Out

Production Logs
 AGENT DEVELOPMENT
 Routing
 BDM
 Appraisal
 Additional
 Reports
 Unpaid Time
 Labor Efficiency
 Teams
 Quality
 Utilities
 Documentation
 Division Data

800

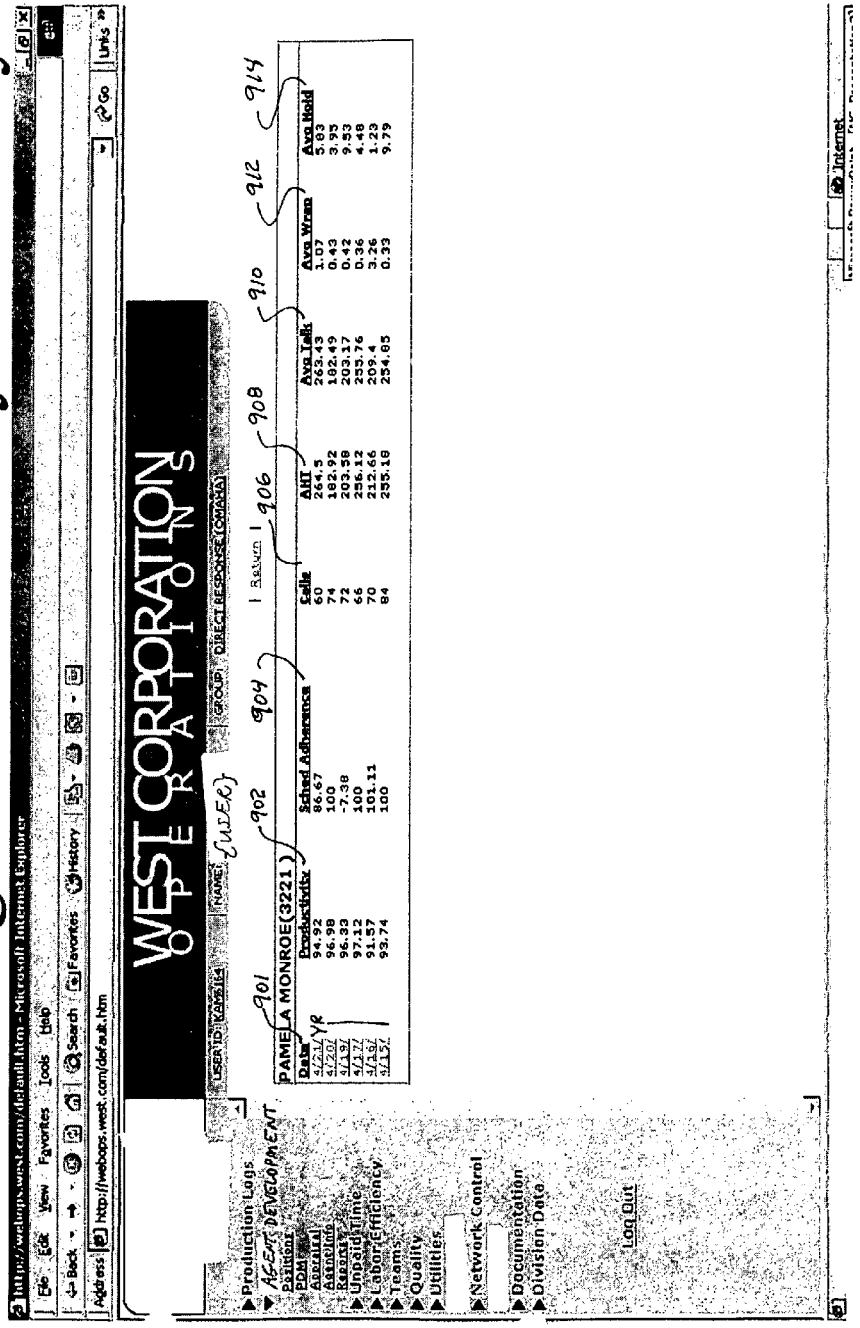

FIGURE 10

Agent Productivity Detail

PAMELA MONROE — 1002

| | PAYROLL TIME | | | | | | PAYROLL TIME | Timeloss | |
|---|---|---|---|---|---|---|---|---|---|
| | REG 7.5 | EH 0 | PH 0 | Break 0.35 | SRPlus 0 | Absent 0 | 6.5 | 0.02 | ACD 5.82 |
| | 1014 | 1016 | 1018 | 1020 | 1022 | 1024 | 1026 | 1028 | |
| | | | | ET 0 | LBreak 0 | | | Lunch 0 | Lunch 0 |
| | | | | | | | | 1030 | 1032 1034 |

Productivity 94.92
Adherence 86.67

Efficiency Report

| Date | Payroll Time | AEP | Talk | Wait | Wrap | Semadt | DN | UPT | Labor Eff | Total Eff |
|---|---|---|---|---|---|---|---|---|---|---|
| 05/16/YR | 1044.2 | 906.71 | 740.52 | 94.23 | 59.27 | 0.03 | 13.69 | 89.45 | 86.83 | 70.92 |
| 05/15 | 991.35 | 855.42 | 642.3 | 140.1 | 60.75 | 0 | 12.23 | 83.38 | 86.29 | 64.79 |
| 05/14 | 991.02 | 941.14 | 721.86 | 136.53 | 68.1 | 0 | 14.65 | 85.26 | 84.18 | 64.57 |
| 05/13 | 990.27 | 859.29 | 679.2 | 99.51 | 66.72 | 0 | 13.85 | 88.23 | 86.77 | 68.59 |
| Summary | 4143.83 | 3562.56 | 2783.89 | 470.38 | 253.84 | 0.03 | 54.42 | 86.59 | 85.97 | 67.18 |
| 05/12/YR | 389.62 | 353.26 | 266.09 | 60.17 | 22.96 | 0 | 4.04 | 82.77 | 90.67 | 68.3 |
| 05/11 | 774.78 | 662.54 | 484.74 | 132.21 | 39.87 | 0 | 5.72 | 79.87 | 85.51 | 62.56 |
| 05/10 | 985.45 | 848.72 | 686.57 | 121.68 | 51.24 | 0 | 9.22 | 85.5 | 86.12 | 67.64 |
| 05/09 | 1090.45 | 951.31 | 707.9 | 181.61 | 59.36 | 0 | 12.44 | 80.86 | 88.16 | 64.92 |
| 05/08 | 1067.03 | 922.85 | 694.69 | 190.27 | 55.63 | 0 | 12.24 | 78.67 | 85.55 | 61.35 |
| 05/07 | 1192.35 | 1032.84 | 763.78 | 253.1 | 59.19 | 0.09 | 12.28 | 74.96 | 85.48 | 58.26 |
| 05/06 | 1172.28 | 1032.73 | 796.36 | 133.82 | 69.26 | 0 | 13.3 | 84.91 | 86.1 | 67.93 |
| Summary | 6672.19 | 5790.85 | 4271.13 | 1092.87 | 357.52 | 0.09 | 69.24 | 80.9 | 86.79 | 64.01 |
| 05/05/YR | 432.87 | 372.33 | 271.61 | 69.43 | 26.27 | 0.04 | 4.98 | 81.09 | 86.01 | 62.75 |
| 05/04 | 784.75 | 672.3 | 518.52 | 106.92 | 40.93 | 0.07 | 5.86 | 83.95 | 85.67 | 66.07 |
| 05/03 | 964.45 | 817.93 | 672.78 | 82.43 | 53.71 | 0 | 8.9 | 89.81 | 84.8 | 69.76 |
| 05/02 | 1078.82 | 921.81 | 706.16 | 146.91 | 57.41 | 0 | 11.33 | 83.86 | 85.45 | 65.46 |
| 05/01 | 1109.48 | 967.45 | 788.84 | 96.94 | 69.71 | 0 | 11.97 | 89.85 | 87.2 | 71.1 |
| 04/30 | 1147.73 | 991.87 | 774.95 | 132.9 | 67.62 | 0 | 16.4 | 86.38 | 86.42 | 67.52 |
| 04/29 | 1098.72 | 947.65 | 708.38 | 166.03 | 59.71 | 0 | 13.54 | 82.23 | 86.25 | 64.47 |
| Summary | 6616.82 | 5691.24 | 4441.24 | 801.55 | 375.36 | 0.11 | 72.97 | 85.73 | 86.01 | 67.12 |

– Agent Below Minimum Drill-Downs

WEST CORPORATION

USERID: Rankin   NAME: $USER   GROUP: $CLIENT

Report Parameters

| Print Report | Refresh |

From: 4/1/YR
To: 4/30/YR

* Required Field

{$CLIENT} (TULSA)
Specific Person Stats

MARJORIE BANKS

| Date | Percent | PAYROLL TIME | Break | LBreak | Timelog | ACD |
|---|---|---|---|---|---|---|
| 4/18/YR | 0 | 0 | 0 | 0 | 0 | 0.31 |
| 4/22/ | 0 | 0 | 0 | 0 | 0 | 0.44 |
| 4/23/ | 0 | 0 | 0 | 0 | 0 | 0.48 |
| 4/24/ | 0 | 0 | 0 | 0 | 0 | 0.01 |
| 4/25/ | 0 | 0 | 0 | 0 | 0 | 0.39 |
| 4/26/ | 45.04 | 5.58 | 0.05 | 0 | 0.28 | 2.21 |
| 4/29/ | 97.72 | 8.02 | 0.5 | 0 | 0.17 | 7.16 |
| 4/30/ | 98.03 | 7.77 | 0.28 | 0 | 0 | 7.27 |

For the dates of: $DATE_1 to $DATE_2

{$CLIENT}
Below Minumum Productivity

| Id | Name | Percent | PAYROLL TIME | Break | LBreak | Timelog | ACD |
|---|---|---|---|---|---|---|---|
| 1212 | MARJORIE BANKS | 85.42 | 21.37 | 0.83 | 0.28 | 0.45 | 17.09 |
| 2369 | SPARKLE MARTIN | 89.15 | 19.95 | 1.05 | 0.25 | 0.33 | 16.26 |
| 5902 | BRIAN VICKERS | 90.45 | 142.87 | 7.1 | 0.78 | 13 | 109.57 |
| 4415 | KEM MORROW | 92.69 | 107.75 | 5.17 | 0 | 2.65 | 91.71 |

For the dates of: $DATE_1 to $DATE_2

Schedule Adherence

{CLIENT: TULSA}
Schedule Adherence Report

For the date of: DATE1 TO DATE2

| Id | Name | Scheduled Time | Payroll Time | LT | ET | Lunch | Percent |
|---|---|---|---|---|---|---|---|
| 5002 | BAILEY, MELANIE | 126 | 104.3 | 2 | 5.3 | 8.75 | 94.86 |
| 4003 | CRAFT, ANTHLIA | 217 | 187.37 | 4 | 0.98 | 13.88 | 94.57 |
| 2004 | LARSON, GREGORY | 152.5 | 129.37 | 0.5 | 5.12 | 9.75 | 94.34 |
| 2106 | RIGGS, ELISABETH | 165 | 161.25 | 3 | 1.23 | 9.5 | 94.15 |
| 3129 | BRAND, JENNY | 177 | 137.48 | 0 | 15.63 | 15.28 | 94.11 |
| 1092 | WOODY, KATRINA | 136 | 107.1 | 0 | 10.1 | 11.95 | 93.99 |
| 4542 | FRAZIER, VASHNI | 94 | 74.9 | 1.5 | 5.83 | 6.87 | 93.84 |
| 6510 | QUAZILBASH, MEHDI | 112.5 | 84.98 | 1 | 5.05 | 5.88 | 93.81 |
| 2537 | STONE, ANGELA | 226.5 | 192.95 | 2.5 | 7.83 | 10.45 | 93.79 |
| 5690 | EVITT, SHALONTA | 173.5 | 116.97 | 2.5 | 30.28 | 14.78 | 93.54 |
| 6310 | MORROW, JENNIFER | 185 | 153.75 | 2.5 | 0 | 7.27 | 93.51 |
| 4110 | MIXON, KEM | 190 | 151.72 | 1.5 | 13.03 | 11.13 | 93.46 |
| 5175 | BARTLEY, LANE | 107 | 87.72 | 0 | 3.27 | 8.37 | 93.45 |
| 5252 | MCCOMBS, DENAE | 142 | 110.87 | 3 | 5.92 | 17.35 | 93.37 |
| 5626 | SHELTON, KATHY | 161.5 | 96.42 | 0 | 47.67 | 10.12 | 92.96 |
| 2026 | HERT, TARA | 133.5 | 84.23 | 0 | 32.67 | 7.02 | 92.75 |
| 1022 | TIMBROOK, KAREN | 179 | 131.28 | 0 | 27.43 | 9.27 | 92.26 |
| 3232 | WILLIAMS, SHOSHANA | 161.5 | 116.19 | 0 | 18.45 | 17 | 92.17 |
| 2224 | COURTNEY, LEQUITTA | 185.5 | 151.45 | 0 | 5.62 | 15.12 | 91.92 |
| 5792 | DICKERSON, QEIONNA | 134.5 | 100.78 | 5.5 | 14.58 | 4.27 | 91.5 |
| 2300 | DAVIS, ANGELA | 231 | 152.67 | 6.5 | 51.28 | 6.27 | 91.44 |
| 4566 | LEWIS, DANIEL | 203.5 | 151.95 | 0 | 16.32 | 14.72 | 91.28 |
| 2268 | ALLEN, RICHARD | 129 | 89.13 | 6 | 15.2 | 12.48 | 91.12 |
| 3252 | AVERYT, AMANDA | 144.5 | 113.85 | 3.5 | 4.52 | 11.4 | 91.02 |
| 4590 | OSBORN, ERICKA | 161.5 | 149.83 | 7 | 0 | 9.67 | 90.9 |
| 6267 | COKER, KEARA | 128.5 | 109.18 | 1 | 0 | 8.33 | 90.74 |
| 2692 | PORTER, LONNIE | 147 | 112.47 | 0 | 7.27 | 14.78 | 90.63 |
| 6789 | WELLONS, HORACE | 132 | 98.35 | 0 | 4.07 | 19.42 | 90.42 |
| 5042 | RUSSELL, RICHARD | 134.5 | 95.13 | 0 | 23.67 | 5.62 | 90.42 |
| 4521 | ARCHIBALD, CHARLES | 162 | 89.3 | 2.5 | 57.82 | 4.58 | 89.66 |
| 2932 | TWEEDY, WILLIAM | 189 | 129.28 | 0 | 31.92 | 10.38 | 89.66 |
| 1761 | HARRIS, MATTHEW | 96 | 70.03 | 0 | 15.58 | 1.95 | 89.25 |
| 5220 | ZWOSTA, JANELLE | 123 | 89.6 | 0 | 16.47 | 6.13 | 89.24 |
| 3515 | WEEMS, JENNIFER | 150.5 | 117.97 | 1 | 5.23 | 11.28 | 88.05 |
| 2152 | BENNETT, APRIL | 126 | 91.65 | 2 | 10.5 | 8.6 | 87.37 |

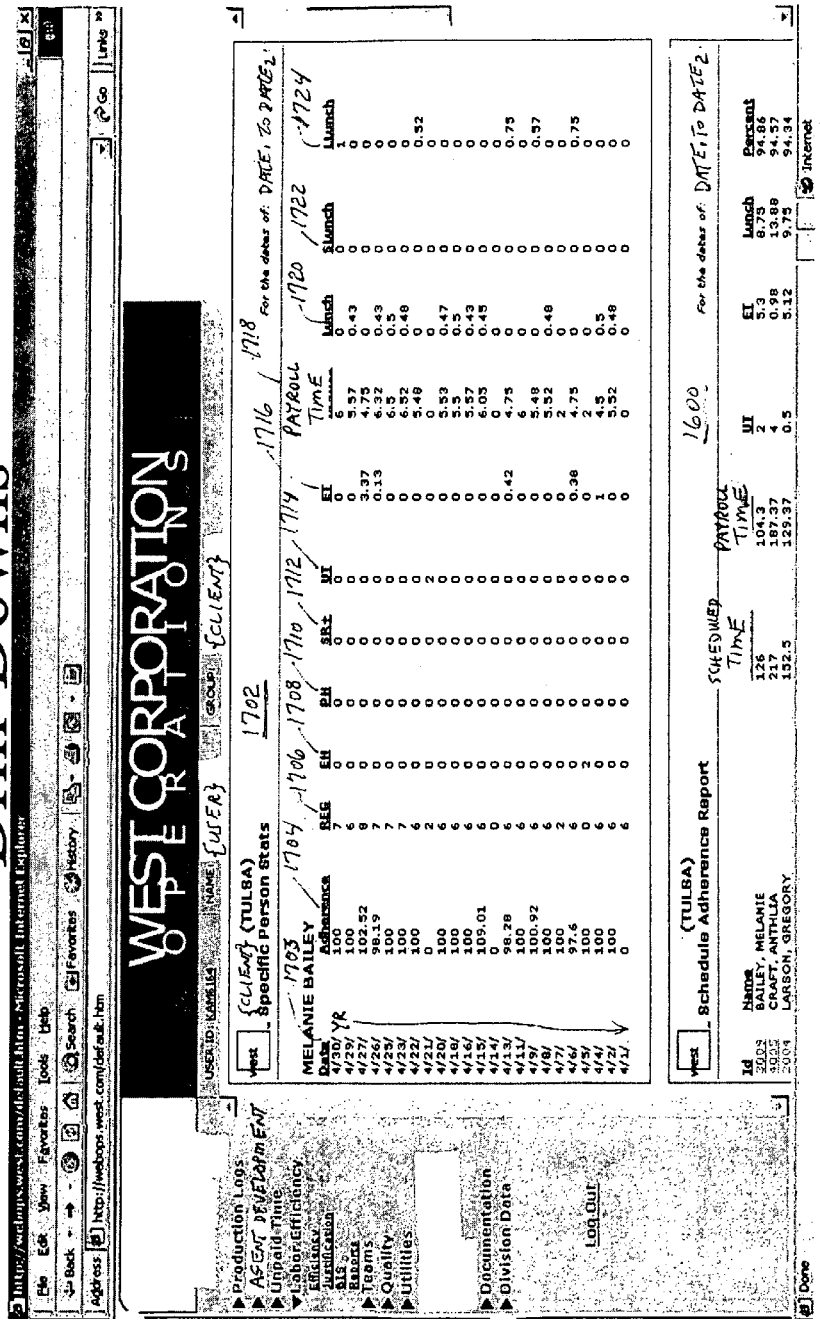

Figure 18

Team Statistics

| Id | Name | Prod | AHT | Avg Wrap | Avg Hold | Calls | Sched Adher | Evals | Meets | Prcnt |
|---|---|---|---|---|---|---|---|---|---|---|
| Main Bank 01 — WALTER WILLIAMS | | | | | | | | | | |
| 1227 | LAKISHA CLAY | 98.08 | 455.24 | 44.54 | 53.75 | 250 | 104.57 | 0 | 0 | 0 |
| 4150 | KATORA LOVE | 93.48 | 488 | 60.37 | 43.48 | 27 | 100 | 0 | 0 | 0 |
| 1304 | CARTETHA WILLIAMS | 99.9 | 441.61 | 65.56 | 19.23 | 208 | 99.42 | 0 | 0 | 0 |
| 1258 | EMILY WHITE | 99.72 | 422.78 | 36.91 | 17.38 | 225 | 111.14 | 1 | 1 | 100 |
| 1252 | EDWIN TIBBS | 96.07 | 430.89 | 32.24 | 16.98 | 170 | 135.49 | 0 | 0 | 0 |
| 2334 | ANITRA FORDE | 96.34 | 345.31 | 45.98 | 37.01 | 392 | 104.88 | 1 | 1 | 100 |
| 2514 | LARRY MCBRIDE | 97.8 | 448.54 | 60.26 | 24.96 | 289 | 100.87 | 0 | 0 | 0 |
| 2272 | LATEIA FERGUSOM-CRIBBS | 94.51 | 413.05 | 71.21 | 58.75 | 321 | 97.31 | 2 | 2 | 100 |
| 2271 | BRIDGETT HATCHETT | 94.71 | 473.69 | 59.08 | 37.84 | 189 | 108.34 | 0 | 0 | 0 |
| 1531 | ANTONIO RAGLAND | 97.44 | 620.02 | 56.06 | 44 | 113 | 167.09 | 2 | 1 | 50 |
| 2571 | DAVID KUNTER | 101.62 | 538.65 | 49.35 | 19.77 | 142 | 89.26 | 2 | 1 | 50 |
| 3652 | GWENDOLINE NOLEN | 123.79 | 449.16 | 45.01 | 16.09 | 199 | 120.93 | 2 | 2 | 100 |
| 3823 | SHELIA JONES | 100.53 | 408.7 | 46.9 | 16.31 | 244 | 91.45 | 2 | 2 | 100 |
| 3202 | MARCUS MASON | 98.21 | 653.21 | 52.79 | 69.69 | 140 | 96.17 | 2 | 2 | 100 |
| 5047 | CLIFFORD JONES | 97.51 | 613.48 | 72.02 | 31.57 | 111 | 127.62 | 2 | 2 | 100 |
| Team Totals: | | 99.84 | 475.9 | 52.36 | 38.57 | 3820 | 99.17 | 18 | 16 | 76.92 |
| Main Bank 02 — TERENCE MCLIN | | | | | | | | | | |
| 1131 | PAMELA LUCAS | 96.63 | 435.36 | 29.5 | 14.5 | 218 | 142.36 | 2 | 2 | 100 |
| 1478 | PAULETTE TENNISON | 82.77 | 503.68 | 68.87 | 92.06 | 212 | 98.16 | 3 | 3 | 100 |
| 1716 | SHAKELLA BROWN | 98.74 | 451.66 | 74.48 | 47.35 | 141 | 97.64 | 1 | 1 | 100 |
| 2022 | LEETHA ALEXANDER | 97.15 | 530.24 | 67.88 | 61.28 | 50 | 100 | 0 | 0 | 0 |
| 2715 | BRANDY CHILDRESS | 96.67 | 481.27 | 42.97 | 47.09 | 147 | 118.79 | 1 | 1 | 100 |
| 2592 | MELISSA SLEDGE | 73.58 | 408.51 | 28.09 | 18.09 | 43 | 92.07 | 0 | 0 | 0 |
| 3652 | CONSTANCE FLETCHER | 85.7 | 468.56 | 67.57 | 38.63 | 152 | 108.6 | 1 | 1 | 100 |
| 2731 | LINDA TRAORE | 95.38 | 331.23 | 63.59 | 9.49 | 213 | 157.48 | 1 | 1 | 100 |
| 2772 | MIKAELA MANGLONA | 99.18 | 492.71 | 61.98 | 38.16 | 136 | 144.02 | 1 | 1 | 100 |
| 3754 | RAMONA FERRELL | 103.64 | 0 | 0 | 0 | 0 | 101.54 | 0 | 0 | 0 |
| 2815 | TINA MCRAE | 94.61 | 562.39 | 64.25 | 56.14 | 143 | 67.22 | 3 | 3 | 100 |
| 3895 | LUCUS ADAMS | 99.74 | 377.05 | 34.05 | 15.21 | 131 | 126.47 | 3 | 1 | 33 |
| 3328 | CHERYL LINK | 99.34 | 365.06 | 25.41 | 9.01 | 221 | 153.8 | 3 | 2 | 66.67 |
| 4062 | ROTESHIA BROWN LOVE | 98.8 | 450.25 | 42.97 | 17.39 | 286 | 129.15 | 1 | 1 | 100 |

Figure 19

Team QA
Drill-Down

Figure 21

{CLIENT} (HUNTSVILLE)
Team Statistics — 2102

Main Bank 01

| Id | Name | Calls | AHT | AvgTalk | AvgWrap | AvgHold | AvgHold | Week | Month | Quarter |
|---|---|---|---|---|---|---|---|---|---|---|
| 1227 | LAKISHA CLAY | 573 | 458.48 | 368.83 | 46.22 | 34.36 | 43.43 | 0 | 72.73 | 80 |
| 1450 | KATORA LOVE | 118 | 550.99 | 412.61 | 69.06 | 32.52 | 79.68 | 100 | 100 | 100 |
| 1603 | CARTETHA WILLIAMS | 556 | 465.88 | 368.93 | 41.19 | 42.9 | 27.90 | 100 | 100 | 90 |
| 1658 | EMILY WHITE | 604 | 449.5 | 391.34 | 33.73 | 42.81 | 16.97 | 0 | 90.91 | 96.97 |
| 2354 | EDWIN TIBBS | 575 | 408.88 | 355.36 | 47.49 | 43.86 | 16.79 | 100 | 92.33 | 84.85 |
| 2394 | ANITRA FORD | 823 | 361.05 | 267.32 | 71.57 | 43.13 | 46.24 | 100 | 93.73 | 84.33 |
| 2679 | LARRY MCBRIDE | 804 | 653.6 | 558.79 | 63.85 | 36.13 | 23.24 | 0 | 83.33 | 80.56 |
| 2777 | LATEIA FERGUSON-CRIBBS | 660 | 418.87 | 304.13 | 61.81 | 36.19 | 50.69 | 100 | 90.91 | 87.1 |
| 3537 | BRIDGETT HATCHETT | 567 | 442.29 | 325.93 | 61.63 | 33.19 | 54.55 | 100 | 100 | 100 |
| 3523 | ANTONIO RAGLAND | 392 | 646.29 | 545.53 | 49.48 | 35.16 | 39.14 | 60 | 92.86 | 89.13 |
| 3664 | DAVID KUNTER | 521 | 533.74 | 457.44 | 46.35 | 93.03 | 26.82 | 50 | 91.67 | 84.38 |
| 3765 | GWENDOLINE NOLEN | 309 | 468.52 | 399.66 | 47.06 |  | 22.51 | 100 | 100 | 90 |
| 3823 | ALICIA BLACK | 17 | 445.18 | 350.12 | 49.09 |  | 48 | 0 | 90 | 89.66 |
| 2902 | SHELIA JONES | 712 | 420.09 | 353.65 | 52.05 |  | 17.35 | 50 | 76.92 | 81.25 |
| 3045 | MARCUS MASON | 379 | 648.4 | 538.82 | 64.7 |  | 57.53 | 80 | 93.75 | 90.63 |
|  | CLIFFORD JONES | 341 | 593.82 | 495.03 |  |  | 34.09 | 100 | 85.71 | 91.3 |
| Team Totals: 8153 | | | 496.98 | 432.71 | 54.24 |  | 0 | 86.67 | 88.68 | 88.85 |

{CLIENT} (HUNTSVILLE) — 2002
QA Report Card

| Team | Calls | AHT | AvgTalk | AvgWrap | AvgHold | AvgHold | Week | Month | Quarter |
|---|---|---|---|---|---|---|---|---|---|
| Main Bank 01 | 8153 | 496.96 | 398.35 | 54.24 | 34.36 | 43.43 | 86.67 | 88.32 | 86.47 |
| Main Bank 02 | 6104 | 446.02 | 360.92 | 52.58 | 32.52 | 88.57 | 88.02 | 86.44 |  |
| Main Bank 03 | 6074 | 489.62 | 373.24 | 73.48 | 42.9 | 95.31 | 90.25 | 86.26 |  |
| Main Bank 04 | 7019 | 604.55 | 502.01 | 59.73 | 42.81 | 89.04 | 90.12 | 90.04 |  |
| Main Bank 05 | 7722 | 540.76 | 433.07 | 63.83 | 43.86 | 90.2 | 85.27 | 82.52 |  |
| Main Bank 06 | 6503 | 539.63 | 420.51 | 76.01 | 43.13 | 95 | 92.04 | 86.33 |  |
| Main Bank 07 | 6487 | 569.46 | 475.34 | 57.93 | 36.13 | 93.24 | 88.05 | 85.28 |  |
| Main Bank 08 | 10697 | 515.93 | 426.83 | 55.91 | 36.19 | 86.79 | 89.36 | 84.26 |  |
| Main Bank 09 | 6724 | 484.06 | 386.77 | 62.93 | 33.19 | 94.12 | 93.33 | 88.7 |  |
| Main Bank 10 | 4338 | 458.38 | 322.23 | 93.12 | 35.03 | 95.38 | 94.06 | 90.89 |  |

Log Out

FIGURE 22

Team QA Agent
Drill-Down

2200

WEST CORPORATION

USER ID: {SAMPLE} NAME: {USERS} GROUP: {CLIENTS}
1102  218  2102  2202

{CLIENT} (HUNTSVILLE)
Agent Statistics

Data for LAKISHA CLAY — Date between DATE1 AND DATE2

| Date | Calls | AHT | AvgTalk | AvgWrap | AvgHold | #Eval | #Meets | Percent |
|---|---|---|---|---|---|---|---|---|
| 5/19/YR | 32 | 500.03 | 362.16 | 62.19 | 75.69 | 0 | 0 | 0 |
| 5/18/ | 40 | 451.45 | 359.35 | 53.25 | 38.85 | 0 | 0 | 0 |
| 5/16/ | 44 | 391.59 | 314.32 | 51.95 | 29.32 | 0 | 0 | 0 |
| 5/15/ | 19 | 454.21 | 365.37 | 50.95 | 37.69 | 0 | 0 | 0 |
| 5/14/ | 0 | 0 | 0 | 0 | 0 | 0 | 0 | 0 |
| 5/13/ | 0 | 0 | 0 | 0 | 0 | 0 | 0 | 0 |
| 5/12/ | 46 | 470.22 | 339.83 | 48.83 | 81.57 | 0 | 0 | 0 |
| 5/11/ | 15 | 504.8 | 396.27 | 33.47 | 75.07 | 0 | 0 | 0 |
| 5/10/ | 39 | 489.85 | 340.92 | 54.79 | 94.13 | 0 | 0 | 0 |
| 5/9/ | 56 | 427.96 | 352.21 | 47.54 | 28.21 | 0 | 0 | 0 |
| 5/8/ | 66 | 382.36 | 319.97 | 34.12 | 28.27 | 0 | 0 | 0 |
| 5/7/ | 0 | 0 | 0 | 0 | 0 | 0 | 0 | 0 |
| 5/6/ | 27 | 582.21 | 483 | 47.71 | 51.5 | 0 | 0 | 0 |
| 5/5/ | 28 | 478.37 | 412.96 | 40.07 | 25.33 | 0 | 0 | 0 |
| 5/4/ | 24 | 521 | 418.38 | 61.54 | 41.08 | 0 | 0 | 0 |
| 5/3/ | 32 | 517.94 | 448.13 | 49 | 20.81 | 0 | 0 | 0 |
| 5/2/ | 34 | 415.7 | 355.48 | 32.07 | 28.15 | 0 | 0 | 0 |
| 4/30/ | 53 | 476.94 | 403.32 | 41.7 | 31.92 | 0 | 0 | 0 |
| Totals: 575 | | 458.48 | 368.83 | 48.22 | 49.49 | 0 | 0 | 0 |

{CLIENT} (HUNTSVILLE)
Team Statistics — Date between DATE1 AND DATE2

Main Bank 01

| Id | Name | Calls | AHT | AvgTalk | AvgWrap | AvgHold | Week | Month | Quarter |
|---|---|---|---|---|---|---|---|---|---|
| 1222 | LAKISHA CLAY | 575 | 458.48 | 368.83 | 46.22 | 43.43 | 0 | 72.73 | 80 |
| 1450 | KATORA LOVE | 118 | 560.99 | 412.61 | 48.7 | 79.68 | 100 | 100 | 100 |
| 1903 | CARTETHA WILLIAMS | 556 | 465.88 | 368.93 | 69.06 | 27.9 | 100 | 100 | 90 |
| 1258 | EMILY WHITE | 604 | 419.5 | 351.34 | 41.19 | 16.97 | 90 | 90.91 | 96.97 |
| 1252 | EDWIN TIBBS | 575 | 408.88 | 355.36 | 33.73 | 19.72 | 100 | 83.33 | 84.85 |

Production Logs
AGENT DEVELOPMENT
UnitData Time
Labor Efficiency
Reports
Team Info
Quality
Utilities
Documentation
Division Data Log Out

Figure 23

Tenure Reports

Agent Grading by Site

2500

{CLIENT} (HUNTSVILLE)
Agent Grading

GROUP: {CLIENTS}

Data between DATE₁ AND DATE₂

| Id | Employee | Tenure | Tur Score | Prod | Prod Score | SA | SA Score | QA | QA Score | AHT | AHT Score | PIN Score | Total Score |
|---|---|---|---|---|---|---|---|---|---|---|---|---|---|
| 1211 | WENDEE THOMAS | 21.53 | 0.5 | 110.32 | 0.75 | 100.38 | 0.75 | 100 | 0.75 | 408.19 | 0.75 | 0 | 3.5 |
| 2392 | JOSEPH YOBLONSKI | 12.67 | 0.4 | 124.08 | 0.75 | 115.13 | 0.75 | 100 | 0.75 | 471.09 | 0.75 | 0 | 3.4 |
| 3317 | SHANEQUA THOMPSON | 10.57 | 0.3 | 119.64 | 0.75 | 113.71 | 0.75 | 100 | 0.75 | 495.54 | 0.75 | 0 | 3.3 |
| 3305 | TANGELA RUSSELL | 10.07 | 0.3 | 100.94 | 0.75 | 105.65 | 0.75 | 100 | 0.75 | 544.12 | 0.75 | 0 | 3.3 |
| 1416 | JEFFREY CHAPMAN | 9.87 | 0.3 | 136.55 | 0.75 | 102.84 | 0.75 | 100 | 0.75 | 497.78 | 0.75 | 0 | 3.3 |
| 2625 | KEYNON JONES | 9.13 | 0.3 | 125 | 0.75 | 98.43 | 0.75 | 100 | 0.75 | 447.44 | 0.75 | 0 | 3.3 |
| 1134 | PAMELA LUCAS | 22 | 0.5 | 113.39 | 0.75 | 105.18 | 0.75 | 100 | 0.75 | 445.02 | 0.75 | 0 | 3.25 |
| 2730 | KATRINA WALKER | 8.7 | 0.2 | 98.55 | 0.75 | 113.92 | 0.75 | 100 | 0.75 | 538.75 | 0.75 | 0.25 | 3.25 |
| 3921 | CASSANDRE VERNEUS | 8.47 | 0.2 | 96.95 | 0.75 | 137.02 | 0.75 | 100 | 0.75 | 444.83 | 0.75 | 0 | 3.2 |
| 4026 | JAIME TAYLOR | 7.77 | 0.2 | 109.43 | 0.75 | 121.15 | 0.75 | 100 | 0.75 | 352.86 | 0.75 | 0 | 3.2 |
| 4272 | DARIUS JEFFERSON | 6.83 | 0.2 | 110.6 | 0.75 | 114.01 | 0.75 | 100 | 0.75 | 482.22 | 0.75 | 0 | 3.2 |
| 4338 | SONG FOSTER | 6.6 | 0.2 | 99.3 | 0.75 | 103.58 | 0.75 | 100 | 0.75 | 421.9 | 0.75 | 0 | 3.2 |
| 4482 | MICHAEL PENDLETON | 6.13 | 0.2 | 96 | 0.75 | 98.37 | 0.75 | 100 | 0.75 | 324.22 | 0.75 | 0 | 3.2 |
| 2292 | SHUWANDA OUTLIM | 15.23 | 0.4 | 110.43 | 0.75 | 131.73 | 0.75 | 100 | 0.75 | 446.22 | 0.75 | 0 | 3.15 |
| 2551 | LAKENYA TRAVIS | 14.3 | 0.4 | 115.76 | 0.75 | 108.19 | 0.75 | 100 | 0.75 | 523.35 | 0.75 | 0.25 | 3.15 |
| 4594 | LATASHA COX | 5.9 | 0.1 | 135.83 | 0.75 | 100.92 | 0.75 | 100 | 0.75 | 477.45 | 0.75 | 0 | 3.1 |
| 2682 | ZULEKIA STEWART | 5.9 | 0.1 | 119.47 | 0.75 | 101.58 | 0.75 | 100 | 0.75 | 595.2 | 0.75 | 0 | 3.1 |
| 4573 | ANGELA EVERSON | 5.9 | 0.1 | 103.57 | 0.75 | 110.17 | 0.75 | 100 | 0.75 | 625.51 | 0.75 | 0 | 3.1 |
| 4562 | SARAH WAGNER | 5.67 | 0.1 | 135.53 | 0.75 | 100.49 | 0.75 | 100 | 0.75 | 420.27 | 0.75 | 0 | 3.1 |
| 4608 | SHENA FULLER | 5.67 | 0.1 | 101.66 | 0.75 | 120.81 | 0.75 | 100 | 0.75 | 555.13 | 0.75 | 0 | 3.1 |
| 4604 | TAARIQ BAILEY | 5.67 | 0.1 | 100.32 | 0.75 | 101.58 | 0.75 | 100 | 0.75 | 632.58 | 0.75 | 0.25 | 3.1 |
| 4523 | ADELITA CONNER | 5.67 | 0.1 | 125.83 | 0.75 | 101.75 | 0.75 | 100 | 0.75 | 626.92 | 0.75 | 0 | 3.1 |
| 4761 | SHAWN ESTES | 4.7 | 0.1 | 99.85 | 0.75 | 108.87 | 0.75 | 100 | 0.75 | 452.77 | 0.75 | 0 | 3.1 |
| 4792 | JEANNA LACEY | 4.47 | 0.1 | 103.28 | 0.75 | 150.26 | 0.75 | 100 | 0.75 | 508 | 0.75 | 0 | 3.1 |
| 4790 | JESSICA CLARK | 4.47 | 0.1 | 119.79 | 0.75 | 98.57 | 0.75 | 100 | 0.75 | 494.43 | 0.75 | 0 | 3.1 |
| 4855 | CELESTE HOGAN | 4.23 | 0.1 | 96.23 | 0.75 | 110.58 | 0.75 | 100 | 0.75 | 415.41 | 0.75 | 0 | 3.1 |
| 4930 | MILLISTA BERRY | 4.03 | 0.1 | 128.77 | 0.75 | 99.86 | 0.75 | 100 | 0.75 | 621.14 | 0.75 | 0 | 3.1 |
| 4062 | ROTESHIA BROWN LOVE | 3.8 | 0.1 | 98.36 | 0.75 | 113.17 | 0.75 | 100 | 0.75 | 455 | 0.75 | 0 | 3.1 |
| 4946 | AARON LUMSDON | 3.33 | 0.1 | 109.55 | 0.75 | 114.21 | 0.75 | 100 | 0.75 | 337.83 | 0.75 | 0 | 3.1 |
| 5047 | MARLON THARPE | 3.33 | 0.1 | 116.16 | 0.75 | 105.16 | 0.75 | 100 | 0.75 | 519.88 | 0.75 | 0 | 3.1 |
| 5049 | TAMMY BEALE | 3.33 | 0.1 | 121.32 | 0.75 | 99.78 | 0.75 | 100 | 0.75 | 536.29 | 0.75 | 0 | 3.1 |
| 5062 | JULIE GIBSON | 3.33 | 0.1 | 107.37 | 0.75 | 121 | 0.75 | 100 | 0.75 | 508.08 | 0.75 | 0 | 3.1 |
| 5047 | TIFFANY JONES | 3.33 | 0.1 | 109.52 | 0.75 | 111.93 | 0.75 | 100 | 0.75 | 631.13 | 0.75 | 0 | 3.1 |

SYSTEMS METHODS, AND COMPUTER-READABLE MEDIA FOR GATHERING, TABULATING, AND REPORTING ON EMPLOYEE PERFORMANCE

BRIEF DESCRIPTIONS OF THE DRAWINGS

Those skilled in the art will readily understand the invention by considering the written description herein in connection with the accompanying drawings, brief descriptions of which drawings follow.

FIG. 2 is a screen shot of an illustrative but non-limiting embodiment of a time log report provided according to the instant invention.

FIG. 3 is a screen shot of an illustrative but non-limiting embodiment of an excused time report provided according to the instant invention.

FIG. 4 is a screen shot of an illustrative but non-limiting embodiment of a time log percentage report provided according to the instant invention.

FIG. 5 is a screen shot of an illustrative but non-limiting embodiment of a report relating to an agent development system provided according to the instant invention.

FIG. 6 is a screen shot of an illustrative but non-limiting embodiment of an agent performance summary report provided according to the instant invention.

FIG. 7 is a screen shot of an illustrative but non-limiting embodiment of a performance appraisal report provided according to the instant invention.

FIG. 8 is a screen shot of an illustrative but non-limiting embodiment of a report relating to a personal development meeting (PDM) conducted with a given agent.

FIG. 9 is a screen shot of an illustrative but non-limiting embodiment of an agent productivity report provided according to the instant invention. This report can list various agent productivity parameters reported for several discrete times.

FIG. 10 is a screen shot of an illustrative but non-limiting embodiment of an agent productivity report that details the individual criteria making up the Productivity and Schedule Adherence calculations listed in FIG. 9.

FIG. 11 is a screen shot of an illustrative but non-limiting embodiment of an efficiency report listing various parameters related to agent performance. This report can be arranged by client and/or call center.

FIG. 13 is a screen shot of an illustrative but non-limiting embodiment of an efficiency justification report.

FIG. 15 is a screen shot of an illustrative but non-limiting embodiment of a report based on the report shown in FIG. 14, but listing parameters for a specific agent.

FIG. 16 is a screen shot of an illustrative but non-limiting embodiment of a report listing schedule adherence parameters for various agents.

FIG. 17 is a screen shot of an illustrative but non-limiting embodiment of a report based on the report shown in FIG. 16, but listing schedule adherence parameters for a specific agent.

FIG. 18 is a screen shot of an illustrative but non-limiting embodiment of a report providing statistics on various teams of agents.

FIG. 19 is a screen shot of an illustrative but non-limiting embodiment of a report based on the report shown in FIG. 18, but listing statistical parameters for a specific agent.

FIG. 21 is a screen shot of an illustrative but non-limiting embodiment of a report based on the report shown in FIG. 20, but listing QA-related parameters for a team of agents chosen from those listed in the report shown in FIG. 20.

FIG. 22 is a screen shot of an illustrative but non-limiting embodiment of a report based on the report shown in FIG. 21, but listing QA-related parameters for a specific agent chosen from those listed in the report shown in FIG. 21.

FIG. 23 is a screen shot of an illustrative but non-limiting embodiment of a report listing collective agent performance by tenure of the agents.

FIG. 24 is a screen shot of an illustrative but non-limiting embodiment of a report that lists agent grades.

FIG. 25 is a screen shot of an illustrative but non-limiting embodiment of a report based on the report shown in FIG. 24, but listing cumulative agent grades by specific call center site.

DETAILED DESCRIPTION OF ILLUSTRATIVE EMBODIMENTS

System Description

As used herein, the term "agent" refers to an employee whose performance is monitored, analyzed, or critiqued by one or more management entities, and whose job duties involve handling a plurality of transactions. As a non-limiting example, the term "agent" may refer to a call center agent responsible for handling, processing, and dispostioning a plurality of respective interactions with persons who call or are called by a call center. The term "user" refers to an entity, live or automated, that has managerial or supervisory authority over one or more agents. Users may be located either at a central management location or at one of a plurality of decentralized, separate locations. Users typically would have authority to access the information generated and reported by the invention as described herein, as well as to critique performance of agents.

Figure 26:
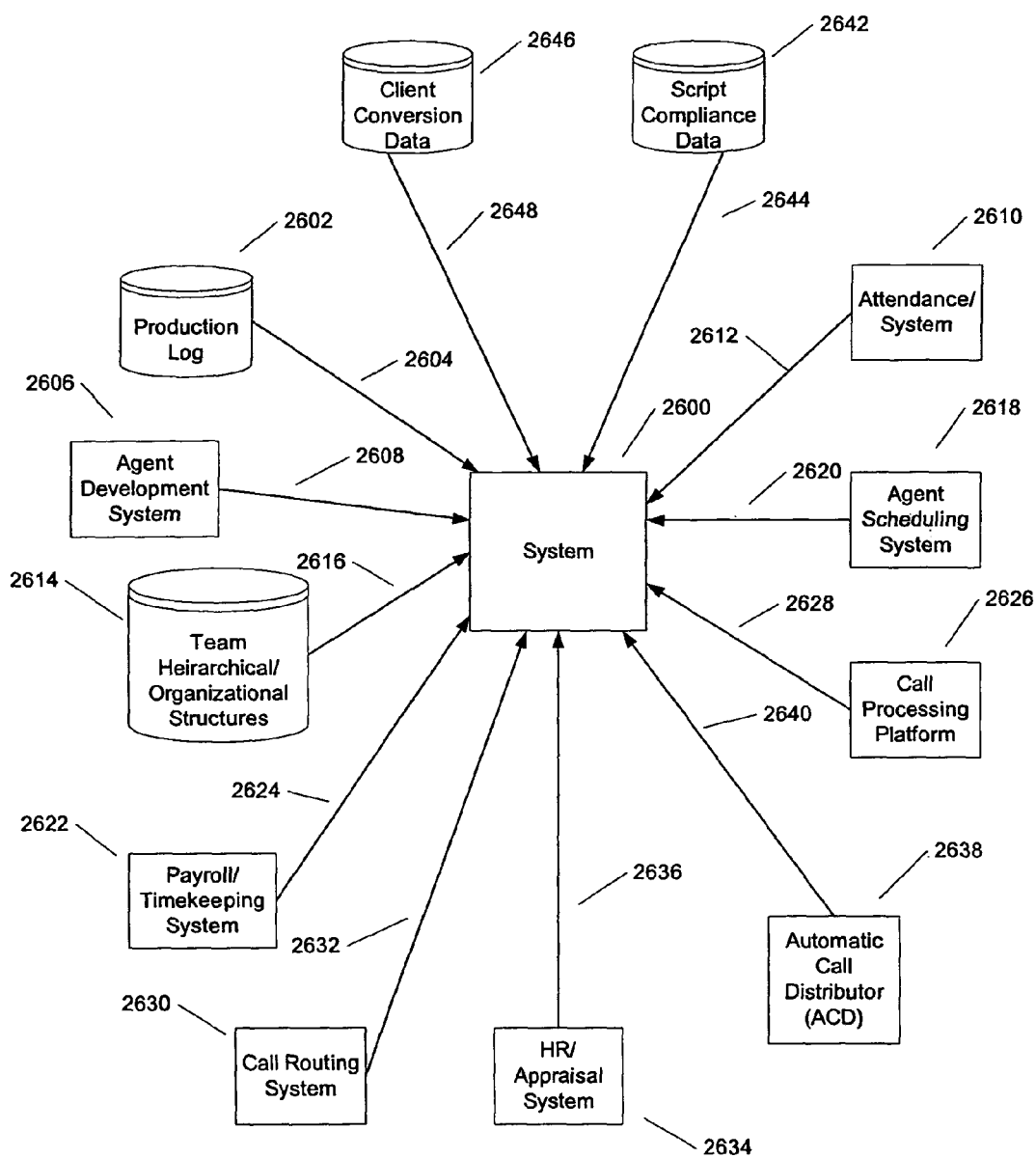
FIG. 26 is a block diagram illustrating various entities from which the invention may receive input, and illustrating data flows representing such input.

FIG. 26 is a block diagram illustrating various entities from which the invention may receive input, and illustrating data flows representing such input. The invention, embodied for example in a system 2600, can accept and process input from a variety of sources, including but not limited to the following illustrative examples. The reports described herein are generated using input from at least one of these various sources:

1) A Production Log 2602 track various parameters related to agent performance, such as a Time Log, Excused Time, Personal Holidays/Vacation, Extended Lunches, Disciplinary Logs, Payroll Adjustments, at least one of these parameters is represented by the arrow 2604. In illustrative but non-limiting embodiments of the invention, the product log 2602 can be implemented as computer-based files residing either in a central location relative to one or more call centers, or in respective computer files hosted locally at each of the said call centers.

2) Data can be collected from an agent training or development system 2606, such as data related to the following: sections and/or teams to which a given agent is assigned or otherwise associated, personal development meetings (PDMs) or other types of meetings during which the agent receives constructive criticism or other remedial instruction related to improving job performance, performance appraisals, on-the-job training (OJT) or continuing instruction, or the like. At least one of these parameters is represented by the arrow 2608.

3) Data can be obtained from or extracted by an agent attendance system 2610, such as: points, demerits, or other indicia of unsatisfactory performance or attendance, as may be reported on a per-agent, per-team, per-section, or other basis; any unpaid time off taken by one or more given agents; or the like. At least one of these parameters is represented by the arrow 2612.

4) A data store 2614 can contain data representing or relating to team structures associated with one or more given agents, such as a team or section to which the agent is assigned or with which the agent is otherwise associated, a human resources (HR) interviewer with whom a given agent met upon hiring, a trainer who instructed a given agent, one or more supervisors or managers assigned to the agent, the begin and end dates for one or more agent's OJT. At least one of these parameters is represented by the arrow 2616.

5) An employee scheduling and schedule management system 2618 can provide data such as: one or more specific attributes or skills of an agent that may be relevant for scheduling purposes; a regular schedule parameter associated with one or more agents; any extra and/or premium hours worked by one or more agents, known to be preferred by one or more agents, or for which one or more agents qualify; any pre-arranged excused time established for one or more agents; any shift replacements approved for one or more agents; any vacations, holidays, personal leave, or other absences from work (whether paid or unpaid); any attendance violations committed by one or more agents; any information related to a termination of a given agent's employment whether such termination was initiated by the agent or the employer; or the like. At least one of these parameters is represented by the arrow 2620.

6) A payroll and/or time-keeping system 2622 deployed by the employer can provide data, such as: payroll time for a given agent; reports providing details on when a given agent punched-in/punched-out for duty; reports indicating long breaks and/or lunches taken by one or more agents, time spent by one or more agents in live production and/or training activities, data representing billable versus non-billable time spent by one or more agents in performing tasks, or the like. At least one of these parameters is represented by the arrow 2624.

7) A call processing platform 2626 supporting one or more agents can provide data, including, but not limited to data as stored on a computer system, which in turn can be (but need not necessarily be) a mainframe computer system such as a TANDEM™ system available from Compaq (www.compaq.com), which is now part of the Hewlett-Packard Company. This call processing data, represented by the arrow 2628, can include any data relating to the number and/or types of calls dispositioned or handled by one or more agents, data indicating when respective agents logged-in and logged-out to handle calls, data captured by an automated system tracking attendance and login parameters associated with agents, or the like.

8) A call routing system 2630, such as, for a non-limiting example, call routing and distribution systems commercially available from GEOTEL™, which now is owned by Cisco Systems, Inc. (www.cisco.com). This call routing system 2630 can use logic or other intelligence in routing calls from the Public Switched Telephone Network (PSTN) to a given call center. The call routing system 2630 can provide data such as, but not limited to, data collected and/or reported on a call by call basis, as well as on a per-agent basis; average length of call (ALC) parameters, grouped by destination telephone number as reported via a dialed number information service (DNIS), and/or grouped by respective agent(s) handling the calls; data reflecting a shortest and/or longest call handled by given agent(s), which data may be grouped by agent and/or by DNIS-reported telephone numbers, or the like. At least some of this data is represented by the arrow 2632.

9) A workforce management and/or performance optimization tool 2634, such as those available commercially from vendors such as Witness Systems, Inc. (www.witness.com), can provide data including, but not limited to, data relating to appraisals processed by, on behalf of, or relating to given agents. This data is represented by the arrow 2636.

10) An automatic call distributor (ACD) system 2638 is well known in the art for directing calls coming into a call center to appropriate agents within the call center. An ACD can provide data including, but not limited to, parameters such as calls answered by one or more agents, average handle time (AHT) metrics associated with one or more agents, staff time expended on given matters, or the like. This data can be grouped or aggregated according to multiple queue assignments and/or agent skill groups, if such constructs are defined in given implementations of ACD systems. This data is represented by the arrow 2640.

Script compliance data 2644 stored in a script compliance data store 2642 can also impact on agent evaluation and performance. In the context of inbound telemarketing, agents may be required by call center client to read scripts precisely, including that portion of a script that offers one or more upsell items to callers after the callers transact for whatever good or service prompted them to call. Parameters relevant to reading of such upsell items include: the number or percentage of upsell scripts read to callers completely and correctly by given agents; the number or percentage of "short reads" committed by an agent, where "short reads" are upsell script readings that have a duration less than the minimum time that it should take to read the script—thereby suggesting that the agent failed to read the entire script; the number or percentage of conversions achieved by the agent, where conversions are offered upsell items that are accepted by the caller—suggesting that the agent read the script fully and enthusiastically. Agent compliance with pre-defined scripts is covered in pending U.S. patent application Ser. No. 09/785,048, filed on 15 Feb. 2001, and entitled "SCRIPT COMPLIANCE USING SPEECH RECOGNITION", and the contents of this application are incorporated herein by this reference as if reproduced here verbatim.

The invention can also receive as input client conversion data 2648 stored in conversion data store 2646. In the context of inbound or outbound telemarketing, for example, teams of agents can be dedicated exclusively to serving specific clients in the banking or financial industries to perform tasks such as credit card account acquisition, customer service, or the like. In this context, another source of agent evaluation data can be records relating to teleservices campaigns or programs conducted on behalf of such clients. Such data can include the number or percentage of conversions achieved by call center agents servicing such campaigns, where the term "conversions" refers to interactions with customers of a call center client that are converted by the agent into completed transactions for whatever good or service the client is offering. In the context of the upsell items discussed above, the term "conversions" can also refer to upsell offers that are ultimately accepted by the caller.

Yet another source of such data (not shown in FIG. 26) can be a software package deployed across a given company to collect, manage, or report on human resources (HR)-specific data. Examples of such HR packages are widely available from a variety of vendors, such as PeopleSoft, Inc. (www-.peoplesoft.com).

Figure 27:
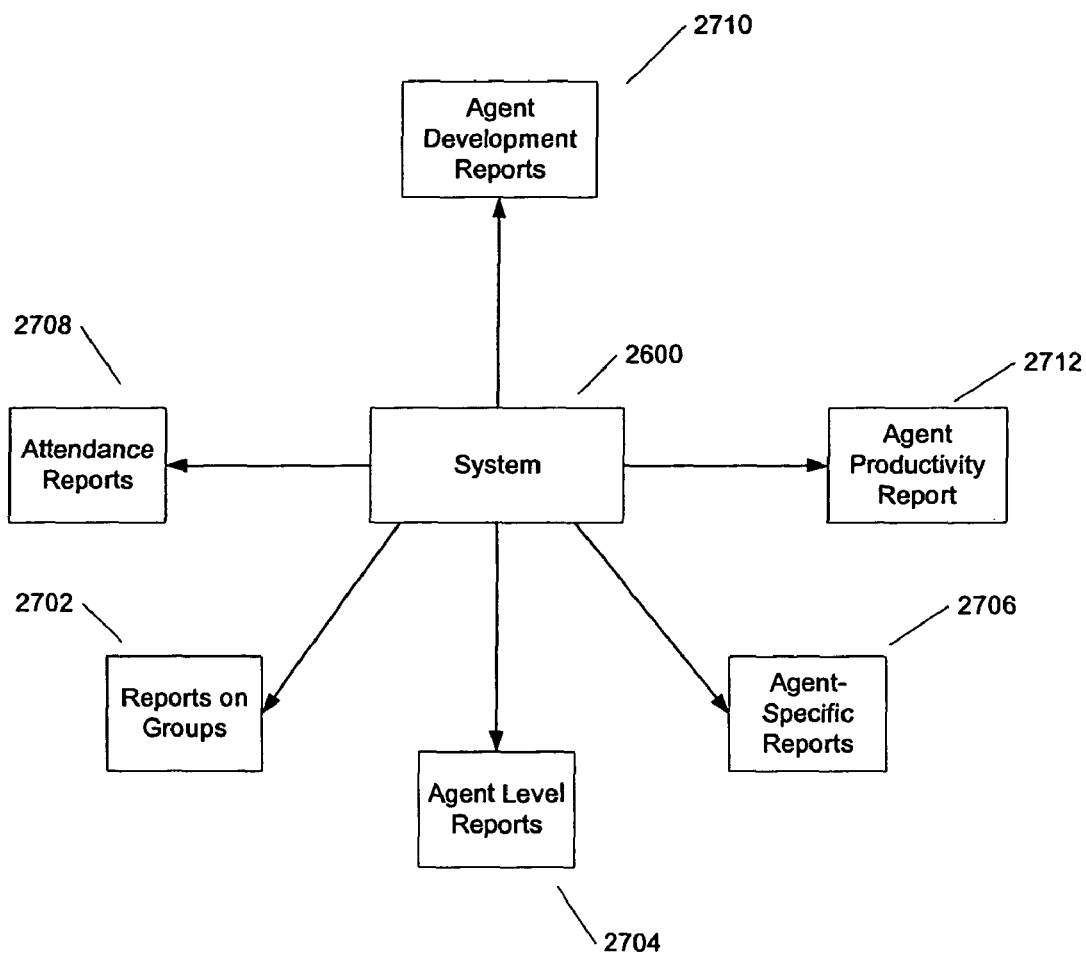
FIG. 27 is a block diagram representing various reports generated by the invention, and illustrating data flows associated with such reports.

FIG. 27 is a block diagram representing various reports generated by the invention, and representing data flows associated with such reports. The system 2600 can process the above data to provide various reports, which can in turn be output on a per-agent level or a group-of-agents (or teams, sections, splits, or the like) level as discussed in further detail below in connection with specific examples of reports. Group-level reports on one or more groups can contain and/or be arranged by group-specific parameters such as, but not limited to, productivity levels, labor efficiency levels, labor efficiency justification parameters, schedule adherence levels, or the like. Agent level reports can contain and/or be arranged by agent-specific parameters such as, but not limited to, daily productivity level, agents below minimum productivity levels, agents meeting or failing certain schedule adherence guidelines, agents working but not scheduled to work, shift efficiency, conversion parameters achieved by agents, average length of call (ALC), ALC by interval(s) defined within a given shift, tenure of agent, or the like. Block 2702 generally represents reports focusing on teams or formal groups of agents, block 2704 generally represents reports focusing on aggregated collections of agents without regard to a group or team structure, and block 2706 generally represents reports tailored to one specific agent.

Another illustrative report is the agent productivity report 2712, which can include or be organized by parameters such as, but not limited to: agent daily productivity, agents below minimum productivity, specific agent productivity, specific agent schedule adherence, agents working more than scheduled, agent attendance, or the like.

Attendance reports 2708 can include or be organized by parameters such as, but not limited to: agents having perfect attendance records, agents achieving attendance incentives, agents receiving attendance warnings, or those agents who have been or may be dismissed due to attendance-related issues, or the like.

Reports 2710 related to agent training or development programs can include or be organized by parameters such as, but not limited to: open assignments or those training assignments not yet completed by an agent, agents who have not yet received performance appraisals, agents who have received opportunities to attend personal development meetings, or the like.

Figure 28:
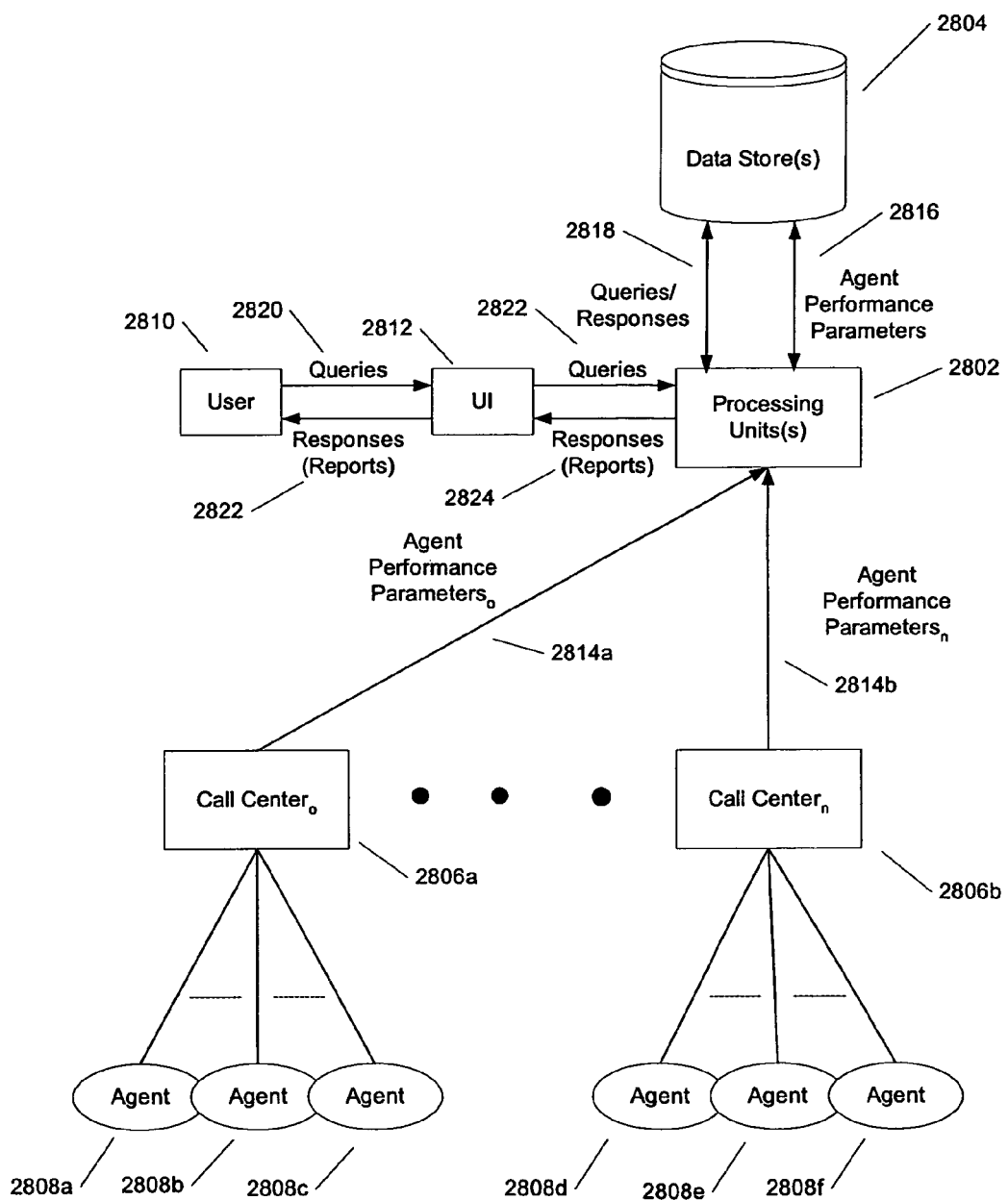
FIG. 28 is an overall diagram of a system constructed according to the invention herein.

FIG. 28 is an overall diagram of a system constructed according to the invention herein. One or more processing units 2802 are coupled to communicate with a plurality of call centers 2806a and 2806b. The processing unit 2802 can include any microprocessor or central processing unit (CPU) commercially available and can be readily selected from those so available by those skilled in the art given the requirements of a given application of the teachings herein. Although FIG. 28 illustrates two call centers 2806a and 2806b, the processing units 2802 could communicate with any number of call centers 2806. In the illustrative but non-limiting embodiment shown in FIG. 28, the processing unit 2802 receives data representing agent performance parameters from the respective call centers 2806a and 2806b via respective links 2814a and 2814b. A plurality of agents are employed by each call center 2806 to handle and process calls involving callers "not shown". The embodiment shown in FIG. 28 illustrates three agents 2808a, 2808b, and 2808c associated with call center 2806a, but any number of agents 2808 could be associated with either call center 2806. Likewise, three agents 2808d, 2808e, and 2808f are shown associated with call center 2806b. The data representing the agent performance parameters transmitted along lines 2814a and 2814b can take the form of any of the performance-related parameters discussed above in connection with FIG. 26. Processing unit 2802 then receives this data, and forwards the same for organization and storage in data store 2804. Those skilled in the art will recognize that data store 2804 could comprise one or more separate data stores either centrally located relative to the call centers 2806a and 2806b, or housed locally at the respective call centers 2806a and 2806b. Those skilled in the art will also appreciate that one or more processing units 2802 could be provided, once again either centrally located relative to the call centers 2806a and 2806b, or housed locally at the call centers 2806a and 2806b. Once received by the processing unit 2802, the data representing the various agent performance parameters can be communicated between the processing unit 2802 and the data store 2804 along line 2816. The processing unit 2802 can also be configured to formulate and transmit queries to the data store 2804, and to receive responses to such queries. These queries and responses are represented generally in FIG. 28 by the line 2818. The representations of lines 2816 and line 2818 are for convenience of illustration only, and do not limit the invention or require to discrete or separate communicate links between data store 2804 and 2802.

A user 2810, who may be typically a live manager or supervisor located either at a central management location or at one of the separate call centers 2806a or 2806b, may wish to generate any one of the several reports discussed herein. To generate such reports, the user 2810 can formulate an appropriate query and transmit the same via a user interface 2812 to the processing unit 2802. The data flow from the user 2810 to the user interface 2812 is represented by the arrow 2820. The user interface 2812 then converts the query as necessary for processing by the processing unit 2812, and transmit the query to the processing unit 2812. The data flow from the user interface 2812 to the processing unit 2802 is represented by the arrow 2822. The processing unit then transmits the query to data store 2804 and receives a response thereto. Once this response is received, the processing unit 2802 forwards the response to the user 2810 via the user interface 2812. The data flow from the processing unit 2802 to the user interface 2812 is represented generally by the arrow 2824, while the data flow from the user interface 2812 to the user 2810 is represented generally by the arrow 2822.

User Interface Description

Figure 1:
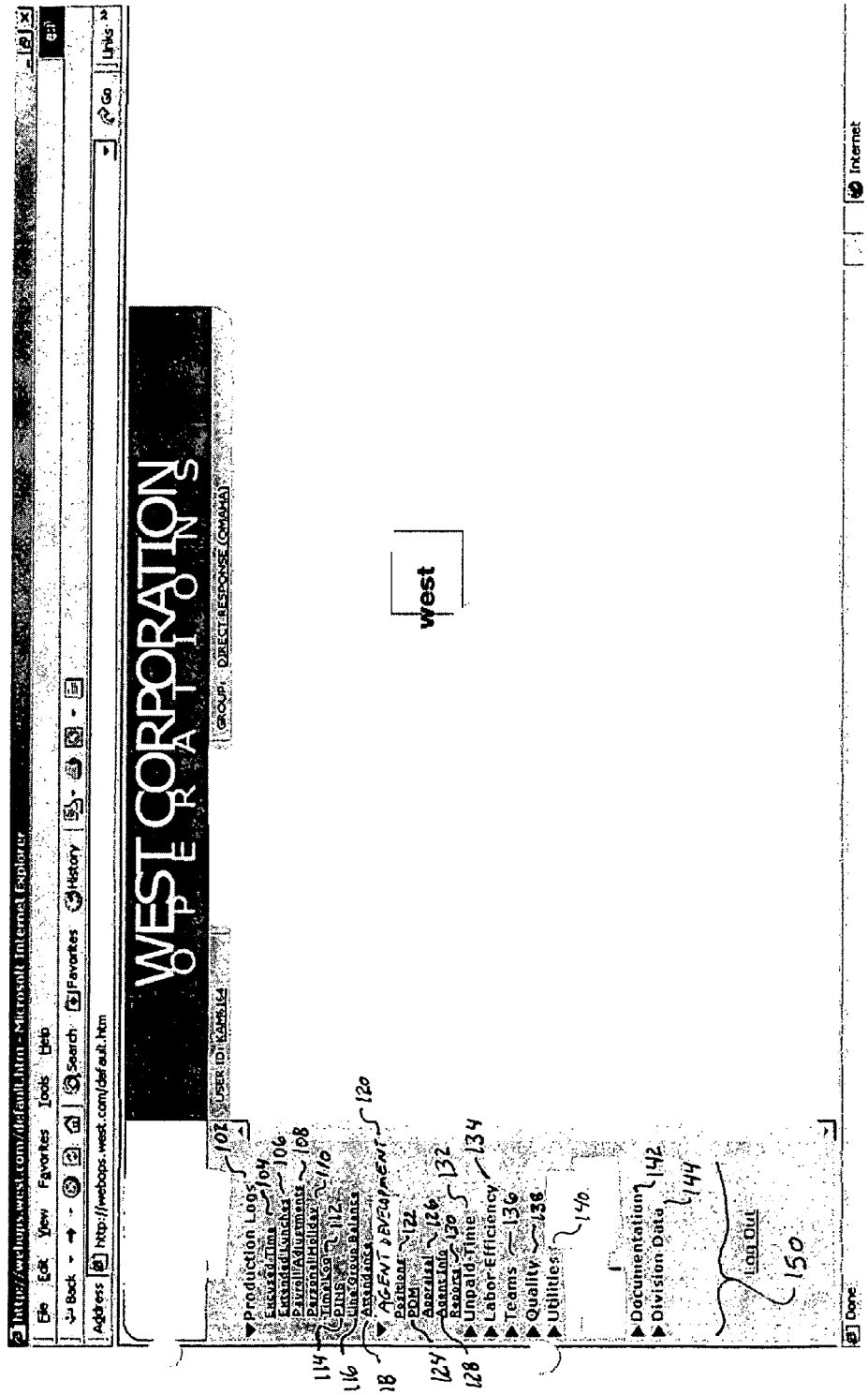
FIG. 1 is a screen shot of an illustrative but non-limiting main menu for a software application provided according to the instant invention.

FIG. 1 is a screen shot of an illustrative but non-limiting main menu 100 for a software application provided according to the instant invention. This main menu 100 can be implemented by those skilled in the art using known graphical user interface (GUI) programming techniques and languages, given the teachings herein. In illustrative but non-limiting embodiments of the invention, an application program implementing this main menu and the overall teachings herein can be realized as a web-based application deployed across a corporate intranet or a global internet. In such web-based embodiments of the invention, this application could be implemented using well-known web browser software, such as Microsoft® Internet Explorer™, Netscape Navigator™, or the like. Users can readily navigate such browser-based applications by known point-and-click techniques.

Before proceeding to describe the invention in more detail, it bears noting that those skilled in the art will appreciate that the various screen shots included herein illustrate rather than limit the invention. Accordingly, those skilled in the art can readily modify, add, or alter certain aspects of the subject matter shown therein without departing from the scope of the instant invention, which is defined by the claims attached hereto, read fairly in connection with this description. Also, the format and layout of the information and other content shown in the several drawings herein can also be modified or altered by those skilled in the art without departing from the scope of the instant invention.

Turning more specifically to FIG. 1, the main menu 100 includes a hierarchical menu system 150, which includes first-level headings for production logs 102, agent development system 120, unpaid time reporting 132, labor efficiency reporting 134, team reporting 136, quality-related reporting 138, system utilities 140, system documentation/help 142, and division data 144. By clicking one or more of these first-level headings, the user can view and access one or more second-level headings. For example, under the heading for production logs 102, illustrative second-level headings can include respective headings for excused time 104, extended lunches 106, payroll adjustments 108, personal holidays 110, time logs 112, personal improvement notices (PINs, or other agent feedback mechanisms) 114, line group balance 116, and attendance parameters 118, all of which can appear under the first-level heading for production logs 102. As another example under the heading for agent development system 120, illustrative second levels headings can include respective headings for positions 122, PDM 124, appraisal 126, agent info 128, and reports 130.

FIG. 2 is a screen shot of an illustrative but non-limiting embodiment of a time log report 200 provided according to the instant invention. The user can reach the time log report 200 shown in FIG. 2 by clicking on the time log heading 112 shown in FIG. 1, although the user may access the time log report 200 other ways without departing from the scope of the invention. As shown, the time log report 200 can list a current date (column 202), the identifiers and names of the various personnel, columns 204 and 206 current activities (column 208), a start and a stop times (columns 210 and 212, respectively), time (column 210 and 212) and total times they have committed to those activities (column 214). As shown in FIG. 2, the time log report 200 can include data for a given specific entity, such as a call center, but can also include consolidated data for a plurality of such entities. The entity for which the report 200 is being generated is represented by the reference number 218. Also, as indicated by the reference numeral 216, a range of dates over which data is to be gathered can be specified.

FIG. 3 is a screen shot of an illustrative but non-limiting embodiment of an excused time report 300 provided according to the instant invention. The user can, for example, reach the excused time report 104 by clicking on the excused time heading 104 shown in FIG. 1, although the user may access the time log report 200 other says without departing from the scope of the invention. As shown, the excused time report 300 can list the current date (column 302), the identifiers and names of various personnel (agents or supervisors) (columns 304 and 306, respectively), the start and end points for the time that a given person is excused from work (column 308), the total elapsed time that the given person has been excused (column 310), and the name or other identifying indicia of the person who excused the given person from work (column 312).

Figure 4:
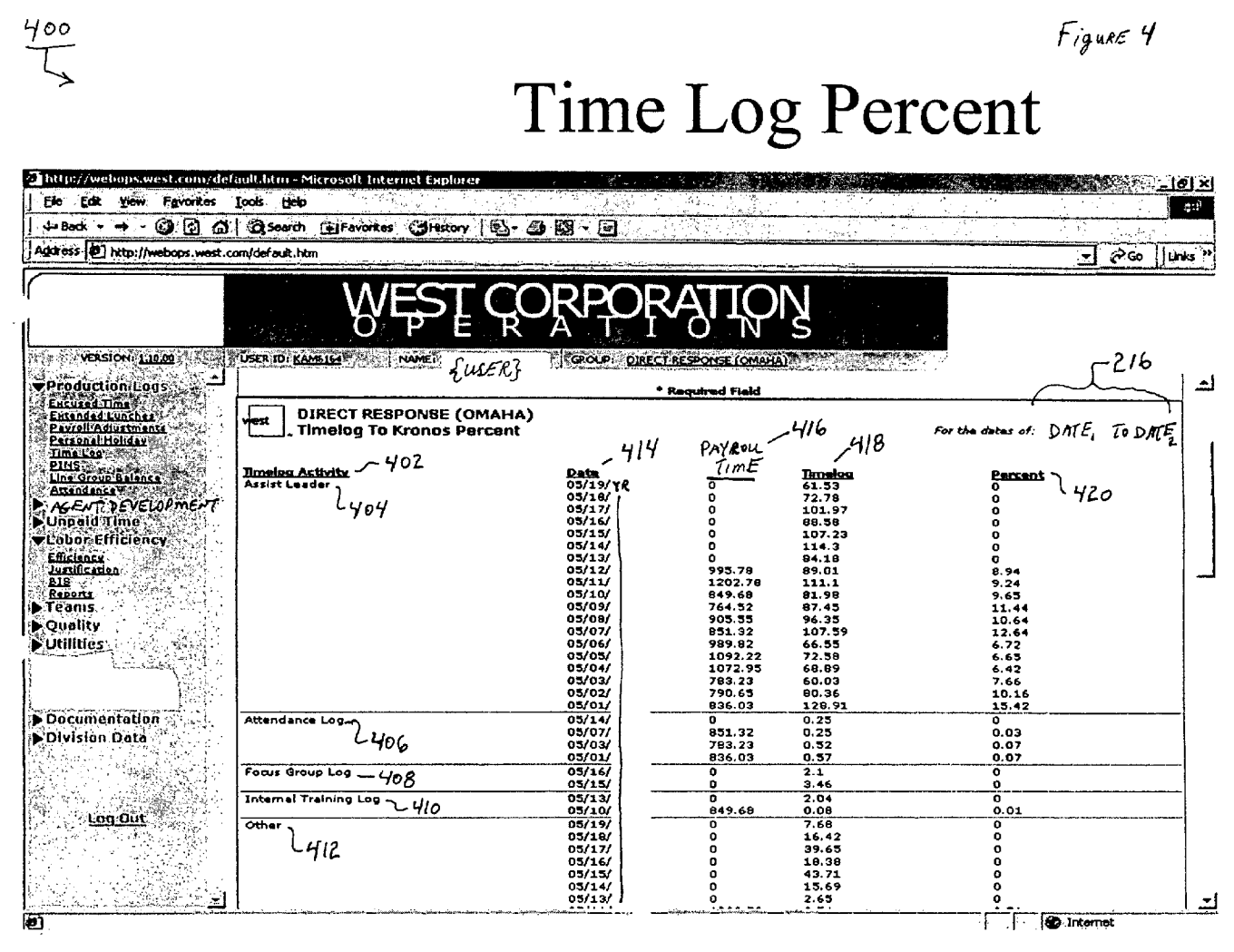

FIG. 4 is a screen shot of an illustrative but non-limiting embodiment of a time log percentage report 400 provided according to the instant invention. This report 400 contains entries under column 402 for the various activities shown in column 208 from FIG. 2. Each activity category is listed separately, and various parameters can be reported for each category across the range of dates 216. Column 402 contains the various activity categories from column 208 of the time log report 200, such as assist leader activity 404. Attendance log activity 406, focus group log activity 408, internal training log activity 410, and a catch all activity category indicated as "other" 412. Date column 414 indicates each of the various dates falling within the range of dates indicated at reference numeral 216. Column 416 indicates the total amount of time worked during a given day. Column 418 indicates the amount of time devoted by personnel to the given time log activity indicated under time log activity column 402. By dividing a given entry in column 418 by the corresponding entry in column 416, the invention can derive the percentage parameters recorded in column 420. For example, as indicated by the reference numeral 421, on May 12, personnel devoted a total of 89.01 units to the activity of assist leader 404, out of a total time expenditure of 995.78, thereby resulting in a percentage of 8.94 percent of the time expended on May 12 being devoted to the activities of assist leader 404. Users may access this report by clicking on the Labor Efficiency menu item on the left, chosing Reports, and selecting a TimeLog to Payroll Time Percent Report from a drop down list.

FIG. 5 is a screen shot of an illustrative but non-limiting embodiment of a report 500 relating to an agent development system provided according to the instant invention. The user may access this report 500 by clicking the first-level heading 120 for the agent development system as shown in FIG. 1, although users may access this report 500 in other ways without departing from the scope of the invention. The report 500 as shown in FIG. 5 lists data pertaining to several agents in a first area 502, and provides more detail for each agent in a second area 504.

Turning specifically to first area 502, column 506, labeled "position", indicates various positions to which various agents in training may be assigned. Identifier column 508 indicates a unique identifier or other number associated with each agent. Agent name column 510 lists the name of each agent in training. Various reports shown herein can include certain areas that are highlighted or otherwise made links or "hot" as understood in the GUI art to indicate their status as hyperlinks that are responsive to user input (for example "clicks" or other input signals, or keyboard actions) to enable the user to jump or drill-down to more detailed information.

Regarding second area 504, this area can provide summary information for each agent listed in area 502. In addition to the columns 506, 508, and 510 described above in connection with first area 502, second area 504 includes additional columns for a date of a last appraisal (column 512), a date of a last personal development meeting (column 514), a productivity parameter (column 516), a conversion ratio or parameter (column 518), and occurrence parameter (column 520), and a column 522 listing any open assignments relating to the given agent.

For example, the column of IDs denoted generally by reference numeral 508 in area 502 can be configured as respective links pointing to further pages that contain more detailed information about each ID. The user can thus drill-down to a specific agent by clicking the corresponding ID.

FIG. 6 is a screen shot of an illustrative agent performance summary report 600 for a given agent, which report 600 can be accessed by clicking one of the IDs in column 508 of FIG. 5, in this example, ID 3221. The illustrative summary report 600 shown in FIG. 6 provides performance and employment information for the employee corresponding to ID 3221. In particular, area 602 indicates any pending matters assigned to the given agent, as well as a score and a date of completion relating to such matters. A hire date associated with the selected agent can be displayed in a field 603. Area 604 lists data representing one or more appraisals issued to the agent, with FIG. 6 showing the last six appraisals as an example. Data for each of the appraisals is listed in a respective row, and as shown in FIG. 6, certain fields within each row can be made links or "hot" fields, such that the user can link, click, or drill-down to review selected appraisals in detail, for example an appraisal issued on March 19$^{th}$ as indicated by reference numeral 605. As shown in FIG. 6, the "Write dates" can be made links or "hot" fields, and a user can click on any of these dates to view the appraisal that was written on that date. Area 606 lists data representing one or more personal development meetings (PDMs) involving the given agent. As with area 604, the "Write dates" 615 in area 606 can be made "hot" fields, such that a user can click on any of these dates to view the PDM that was written on that date. Regarding areas 604 and 606, column 619 indicates the date that the given appraisal or PDM was issued, and a column 621 indicates the name of the person issuing the appraisal or the PDM. In area 604, a column 623 can indicate the score that the agent received on the given appraisal. A fourth area 608 lists the number of occurrences associated with the given agent. Occurrences are a type of attendance violation, and agents might accrue occurrences for being late, leaving early, tardy, absent, or committing other types of attendance-related infractions.

Area 610 lists summary data reflecting the agent's performance over a given period of time, for example six weeks. As shown in FIG. 6, the "Start" dates 623 in area 610 can be made "hot" fields, such that a user can click on any of these dates to view more specific agent performance data relating to that particular date. Column 622 specifies the end date for a given duration over which the agent's performance is reported. Column 624 reports a productivity parameter reported for the given agent. Column 626 records a conversion parameter associated with the given agent. Column 628 reports a schedule adherence parameter associated with the given agent. Column 630 reports the number of calls taken by the given agent as reported by a automatic call distributor system "ACD". Column 632 reports an AHT parameter associated with the given agent. Column 634 reports a talk time parameter associated with the given agent. Column 636 reports a hold time parameter associated with the given agent. Column 638 reports a call wrap-up time associated with the given agent. As shown in FIG. 6, each of the columns 624, 626, 628, 630, 632, 634, 636, and 638 can be reported for each of the various periods defined by columns 622 and 623.

Area 612 lists summary data relating to performance improvement notices (PINs) issued to the given agent. This area 612 can include respective columns for information related to respective PINs given to various agents. For example, columns can be provided for reporting dates of occurrences, categories of occurrences, codes assigned to specific incidents, types of follow-up actions taken, or a date a pin formally issued to the agent.

FIG. 7 is a screen shot of an illustrative but non-limiting embodiment of a performance appraisal report 700 provided according to the instant invention. A user can access this report 700, for example, by clicking on one of the links 605 as shown in FIG. 6 to review a performance appraisal that issued on a selected date. The format of the appraisal report 700 can take any form appropriate in a given implementation, including but not limited to the form shown in FIG. 7. The content of the appraisal report 700 can be selected by those skilled in the art so as to grade the agent on whatever parameters or criteria are deemed important or material when appraising performance in various job capacities. The example report 700 shown in FIG. 7 is tailored to an agent working in a call center, but this report 700 may be tailored to accommodate appraisals issued to other types of employees as well, without departing from the scope of the invention.

FIG. 8 is a screen shot of an illustrative but non-limiting embodiment of a report 800 relating to a personal development meeting (PDM) conducted with a given agent. A user can access this PDM report 800, for example, by clicking on one of the hot fields 607 as shown in FIG. 6 to review a PDM report 800 that issued on a selected date. The format of the PDM report 800 can take any form appropriate in a given implementation, including but not limited to the form shown in FIG. 8. The content of the PDM report 800 can be selected by those skilled in the art so as to convey to the agent whatever information, instruction, or direction are deemed important or material when meeting with an agent to improve his/her job performance. The example report 700 shown in FIG. 8 is tailored to an agent working in a call center, but this report 700 may be tailored to accommodate performance improvement measures issued to other types of employees as well, without departing from the scope of the invention.

FIG. 9 is a screen shot of an illustrative but non-limiting embodiment of an agent productivity report 900 provided according to the instant invention. Users may access this report by selecting the Labor Efficiency menu item on the left, selecting Reports from the submenu, then selecting View Specific Agent Productivity from the drop down list. This productivity report 900 lists various agent productivity parameters reported for several discrete times. As a non-limiting example, FIG. 9 illustrates these parameters reported on a daily basis, which reporting duration may be appropriate in a call center context. However, other durations may be more appropriate in other applications, note that the entries in the date column 901 can be made into hyperlinks enabling a user to click on the respective dates to access another report containing more detailed information pertaining to that date. This non-limiting example of the productivity report 900 lists several calculated, measured, or other types of parameters such as a general productivity parameter 902, a schedule adherence parameter 904, a calls taken parameter 906, an average handling time (AHT) parameter 908, an average talk time parameter 910, an average wrap time parameter 912, and an average hold time parameter 914. This list of parameters is illustrative in nature, and other parameters can be added or certain parameters shown in FIG. 9 can be deleted without departing from the scope of the invention.

FIG. 10 is a screen shot of an illustrative but non-limiting embodiment of an agent productivity detail report 1000 provided according to the instant invention. This report 1000 lists various agent productivity parameters shown in FIG. 9. The various parameters shown in FIG. 10 are illustrative in nature, and may vary in various implementations of the invention. In illustrative but non-limiting embodiments of the invention, most productivity data and efficiency data is updated daily, but data may be polled from the work force management system every 15 minutes or otherwise as permitted by a given work force management system. Payroll data for a given day may be received as soon as it is available, but in some payroll systems may not be available until the day after the given day. Also, the availability of the actual time a given agent is logged into the ACD system is dependent on the particular ACD system, and this data may not be available for a given day until the next day. Time log data available is as soon as the call center supervisor enters the data into the system.

A description of the contents of each column shown in FIG. 10 follows:

Column 1002: Productivity is ACD time+Break time/ Agent's time worked for payroll purposes Column 1004: Payroll time is time agent worked for payroll purposes Column 1006: Break is the amount of time an agent spent on break Column 1008: Lbreak is the amount of time an agent spent on long breaks Column 1010: Timelog is the amount of time an agent was conducting miscellaneous activities and was logged-in as such.

Column 1012: ACD is the amount of time an agent spent logged into the automatic call distribution (ACD) system to process calls.

Column 1014: Adherence equals net payroll time divided by net scheduled hours (both of which are defined below)

Net Payroll Time=Gross Payroll Time−Lunch Time− Slunch−Lunch

Net Schedule Hours is Reg (column 1016)+EH (column 1018)+PH (column 1020)+SRPlus (column 1022)−Absent (column 1024)−ET (column 1026)

Column 1016: Reg=Regular Scheduled Hours
Column 1018: EH=Extra Hours Scheduled
Column 1020: PH=Premium Hours Scheduled
Column 1022: SRPlus=Shift Replacements accepted
Column 1024: Absent=Amount of time absent
Column 1026: ET=Excused Time
Column 1028: Payroll time=Total time reported for payroll purposes
Column 1030: Lunch=Amount of time spent on a normal lunch
Column 1032: Slunch=Amount of time spent on a short lunch
Column 1034: Llunch=Amount of time spent on a long lunch FIG. 11 is a screen shot of an illustrative but non-limiting embodiment of an efficiency report 1100 listing various parameters, arranged by client (field 1102) and/or call center (field 218). One illustrative but non-limiting way to access this report 1100 is by clicking the "labor efficiency" heading 134 as shown in FIG. 1. This report 1100 can list data either at the call center level, the product level, or the client level. As shown in FIG. 11, the report 1100 shows data for a given client serviced by a call center in Tulsa. Data for successive weeks can be listed using the column-row format shown in FIG. 11, with, for example, summary rows 1104 associated with each week's worth of data. Performance data captured or calculated for each time period can be tabulated as shown. The specific parameters shown are illustrative rather than limiting; other parameters may be of interest in various implementations of the invention. This format may be especially useful for enabling a supervisor or account manager to review trends (either favorable or unfavorable) in the tabulated performance data, with a view either to correct the cause(s) of unfavorable trends or to discover the cause of favorable trends for replication elsewhere.

Figure 12:
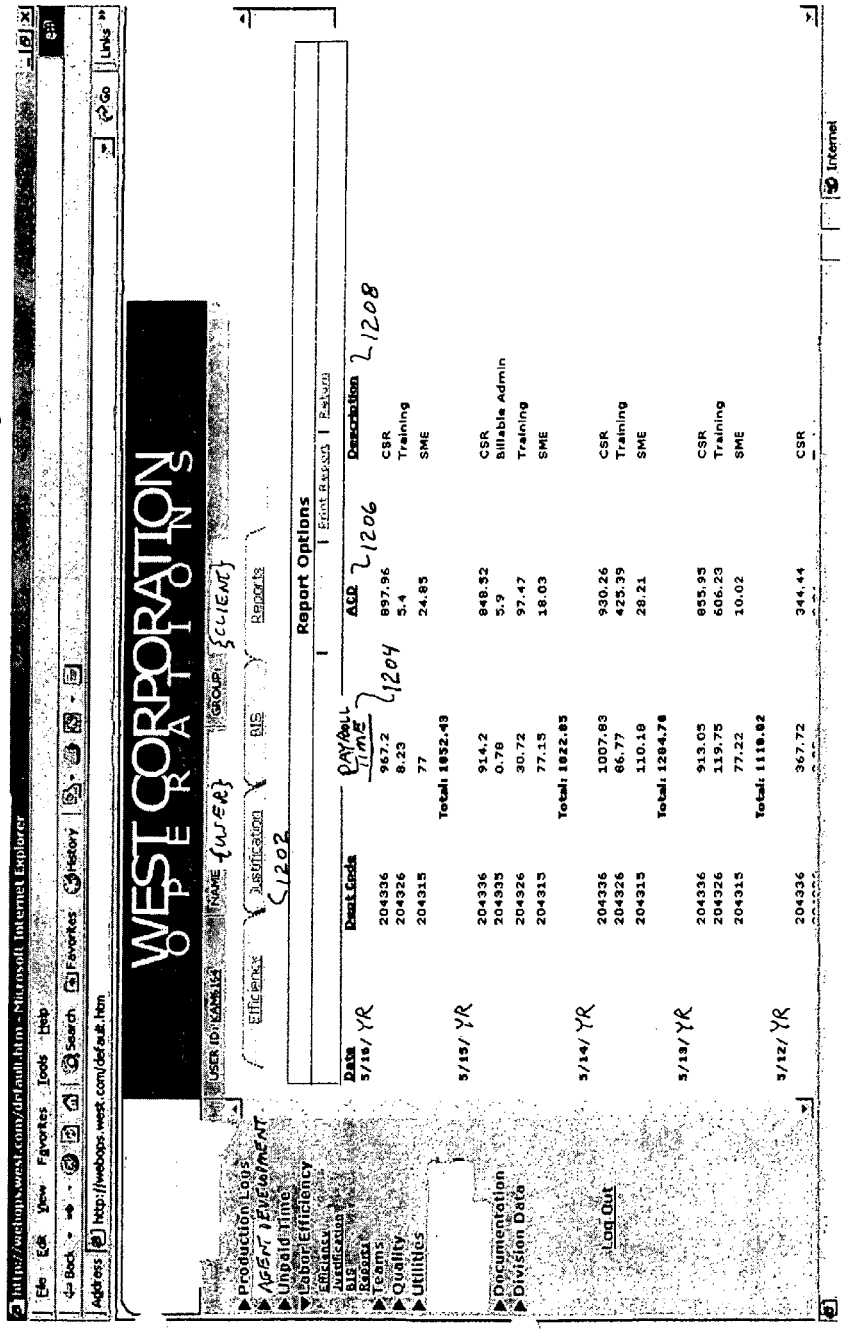
FIG. 12 is a screen shot of an illustrative but non-limiting embodiment of an efficiency report providing departmental and daily detail on the parameters shown in FIG. 11.

A description of the contents of each illustrative column shown in FIG. 11 follows:

Column 1106: Date is the date relevant to the data
Column 1108: Payroll time=Total time worked by agent and reported for payroll purposes
Column 1110: ACD=Total time all agents spent logged into the ACD
Column 1112: Talk=Total time all agents spent talking with a customer while logged into the ACD
Column 1114: Wait=Total time all agents spent waiting in-between calls
Column 1116: Wrap=Total time all agents spent in after call work activities
Column 1118: Consult=Total time all agents spent answering calls from quality assurance
Column 1120: DN=Total time all agents spent making outgoing phone calls
Column 1122: UPT=Ratio of productive time to total ACD staff time (total time an agent spent talking with callers/total time an agent spent logged into the ACD)
Column 1124: Labor Efficiency=ACD time/Payroll time
Column 1126: Total Efficiency=Talk+Wrap/Payroll time FIG. 12 is a screen shot of an illustrative but non-limiting embodiment of an efficiency report 1200 related to that shown in FIG. 11, but providing departmental and daily detail on at least some of the parameters shown in FIG. 11. The efficiency report 1200 can be accessed by clicking on the "Reports" tab 1102 shown in FIG. 11. The embodiment of this efficiency report 1200 shown in FIG. 12 lists the raw data corresponding to the time that personnel are signed-in (or "clocked-in") to a time-tracking system (column 1204) versus the actual time they are on-line to handle calls (column 1206). The efficiency report 1200 can break this data out by department and/or by job description (column 1208).

Figure 13:
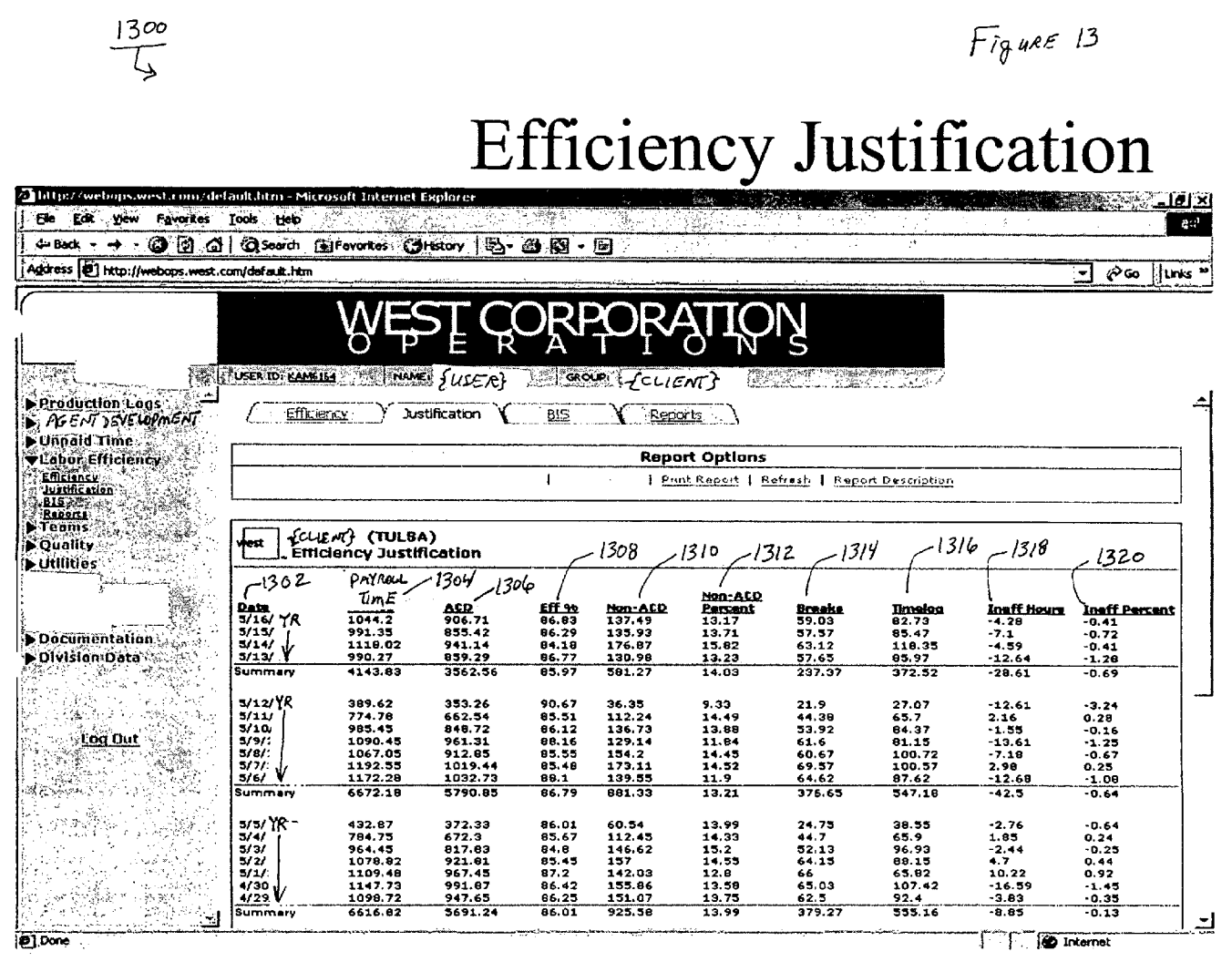

FIG. 13 is a screen shot of an illustrative but non-limiting embodiment of an efficiency justification report 1300. As shown, this report can be arranged by client (field 1102) and/or call center (field 218) as in FIG. 11. One illustrative but non-limiting way to display the efficiency justification report 1300 is by clicking the "Justification" tab 1202 shown in FIG. 12. The efficiency justification report 1300 lists the raw data corresponding to the time that personnel are signed-in (or "clocked-in") to a time-tracking system versus the actual time they are on-line to handle calls, collecting this data on a daily basis, and computing efficiency percentages therefrom. Since this data is tracked on a daily basis, it can be very useful for identifying trends in call center performance.

Figure 14:
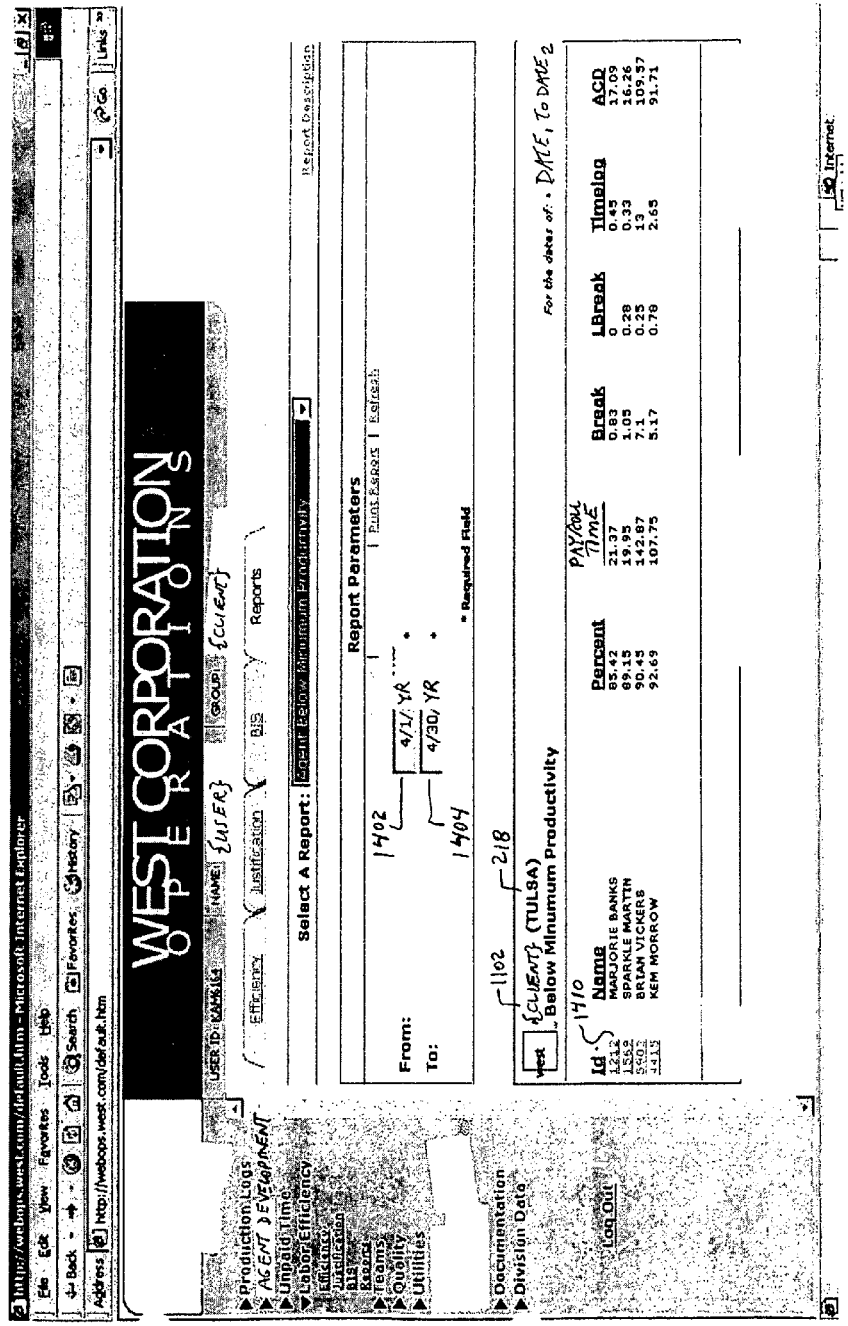
FIG. 14 is a screen shot of an illustrative but non-limiting embodiment of a report listing those agents whose performance falls below some minimum threshold.

A description of the contents of each illustrative column shown in FIG. 13 follows:

Column 1302: Date—is the date relevant to the data shown
Column 1304: Total time worked by agents and reported for payroll purposes
Column 1306: ACD=Total time all agents spent logged into the ACD
Column 1308: Eff %=ACD/Payroll time
Column 1310: Non-ACD=Payroll time−ACD, represents the number of unproductive hours.
Column 1312: Non-ACD Percent=Non-ACD/Payroll time
Column 1314: Breaks=Total amount of hours agents spent on break
Column 1316: Timelog=Total amount of hours agents were logged in the timelog
Column 1318: Ineff Hours=Non-ACD−Breaks−Timelong
Column 1320: Ineff Percent=Ineff Hours/Payroll time FIG. 14 is a screen shot of an illustrative but non-limiting embodiment of a report 1400 listing those agents whose performance falls below some minimum threshold. As shown, this report 1400 can be arranged by client (field 1102) and/or call center (field 218), as in FIG. 11. The invention collects several input parameters, such as start date and end dates for report generation (reference numerals 1402 and 1404, respectively), a client or program identifier 1102, and a call center identifier 218, and generates a list of those agents whose performance falls below some predefined threshold, along with the relevant performance statistics corresponding to the agent's performance. As shown in FIG. 14, the entries under the "Id" column can be made hyperlinks, such that a user can click on those links to display a specific report associated with the given agent, for example, by clicking link 1410.

FIG. 15 is a screen shot of an illustrative but non-limiting embodiment of a report 1500 that might be produced in response to the user's clicking link 1410 in FIG. 14. Field 1502 lists a table of the chosen agent's performance data and history, arranged, for example, on a daily basis. The rest of the report 1500 may be substantially the same as the report 1400.

FIG. 16 is a screen shot of an illustrative but non-limiting embodiment of a report 1600 listing schedule adherence parameters for various agents. As shown, this report can be arranged by client (field 1102) and/or call center (field 218) as in FIG. 11. As shown in this and other Figures herein, the entries under the "Id" column can be made hyperlinks, such that a user can click on those links to access specific records associated with the given agent, for example, by clicking link 1602. The term "schedule adherence" refers generally to a given agent's compliance with time-related requirements while performing his/her assigned duties. Illustrative but non-limiting examples include arrival and check-in at work on time, leaving work and/or checking-out no sooner than the end of an assigned shift (unless excused or authorized to leave early), keeping break and lunch times within prescribed limits, remaining logged-in to accept calls while signed-in during a shift, or the like.

A description of the contents of each illustrative column shown in FIG. 16 follows:

Column 1604: ID—Id of the agent

Column 1606: Name—Name of the agent

Column 1608 Scheduled time—Total number of scheduled hours

Column 1610: Payroll time—Total number of hours worked by agent and reported for payroll purposes Column 1612: UT—Total number of unpaid time-off hours Column 1614: ET—Total number of excused time hours Column 1616: Lunch—Total number of lunch time hours Column 1618; Percent–Payroll time/(Scheduled time–UT–ET–Lunch)

FIG. 17 is a screen shot of an illustrative but non-limiting embodiment of a report 1700 accessible from the report 1600 shown in FIG. 16, but listing schedule adherence parameters for a specific agent. For example, a user could access the report 1700 by clicking on the hyperlink 1602 shown in FIG. 16. The report 1700 can list various schedule adherence parameters on a daily basis, going back as many days as management deems appropriate. By reviewing this report 1700, a user can ascertain the schedule adherence history of a given agent, and take any remedial action indicated by that history. Area 1702 lists data pertaining to the chosen agent, with the rest of the report 1700 incorporating the report 1600.

A description of the contents of each illustrative column shown in FIG. 17 follows:

Column 1703: Date for corresponding row of data

Column 1704: Adherence–Payroll time/(Reg+EH+PH+SR+−UT−ET)

Column 1706: Reg—Regular Scheduled Hours

Column 1708: EH—Extra Hours Scheduled

Column 1710: PH—Premium Hours Scheduled

Column 1712: SR+—Shift Trades Accepted

Column 1714: UT—Total number of unpaid timeoff hours

Column 1716: ET—Total number of excused time hours

Column 1718: Payroll time—Total number of hours worked by the agent and reported for payroll purposes Column 1720: Lunch—Total number of regular hours taken for lunch or other meals Column 1722: Slunch—Total number of short lunch or other meal hours Column 1724: Llunch—Total number of long lunch or other meals hours FIG. 18 is a screen shot of an illustrative but non-limiting embodiment of a report 1800 providing statistics on various teams of agents. As shown in this FIG. 18, report 1800 can be arranged by team leader, team number, client (field 1102), and/or call center (field 218). Data for each team are displayed in respective areas of the report 1800, and each team can be identified or named, as well as being associated with a respective team leader. For example, data associated with a team known as "Main Bank 1" can be shown in an area 1802, while data associated with a team known as "Main Bank 2" can be shown in an area 1804, and so on. Within the area reserved for each team, the members of that team can be listed, along with the team leader. As shown in FIG. 18, this team listing can include a column 1808 for agent ID (note that each entry in this column—for example ID 806—can be configured as a hyperlink to facilitate "jumping" or "drilling-down" to that agent's records), a name column 1810 listing the agent's name, a productivity parameter in column 1816, a Average Handling Time (AHT) parameter in column 1814, an average call wrap-up time parameter in column 1816, an average call holding time parameter in column 1818, a number of calls taken parameter in column 1820, a schedule adherence parameter in column 1822, and a percentage in column 1828 of the "meets" (column 1824) to the "evals" (column 1826). "Evals" is the number of evaluations each employee has received, and "Meets" are the number of one-on-one meetings an agent has had with a supervisor.

Figure 19:
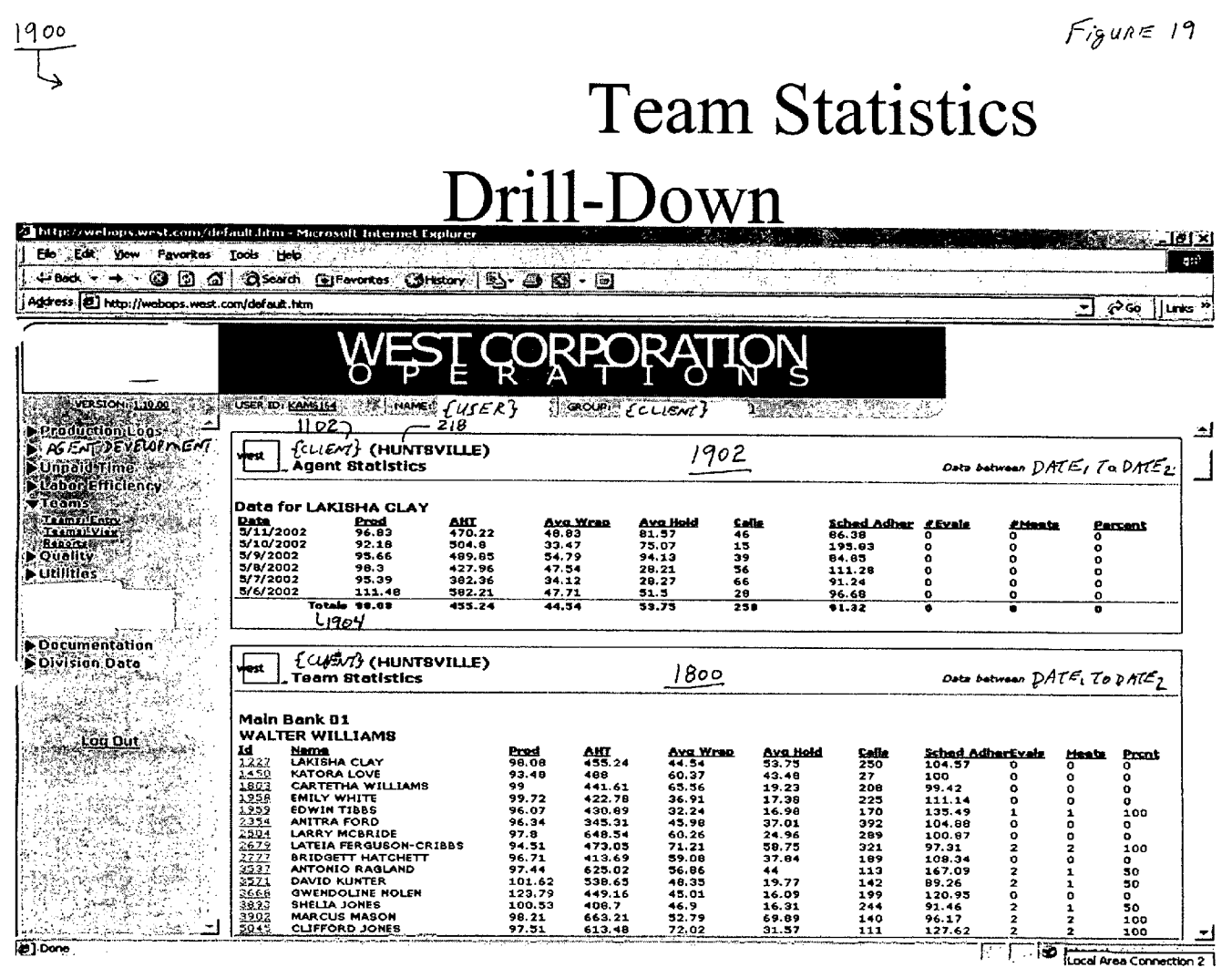

FIG. 19 is a screen shot of an illustrative but non-limiting embodiment of a statistical report 1900 similar to that shown in FIG. 18, but listing statistical parameters for a specific agent. As an illustrative, but non-limiting embodiment, a user could access the report 1900 by clicking on one of the hyperlinks shown in FIG. 18, such as link 1806. Report 1900 includes an area 1902 displaying data relating to the specific agent whose ID was clicked by the user in FIG. 18. Area 1902 displays the relevant performance parameters associated with the specific agent, for example, listed over a given time period, such as a number of days. Area 1902 can also include a summary row 1904 that contains respective entries for averages or totals for the data represented in at least some columns of area 1902. Data associated with the team with which the agent is working or with which the agent is associated can be shown in area 1802, which is essentially the same as area 1802 shown in FIG. 18.

Figure 20:
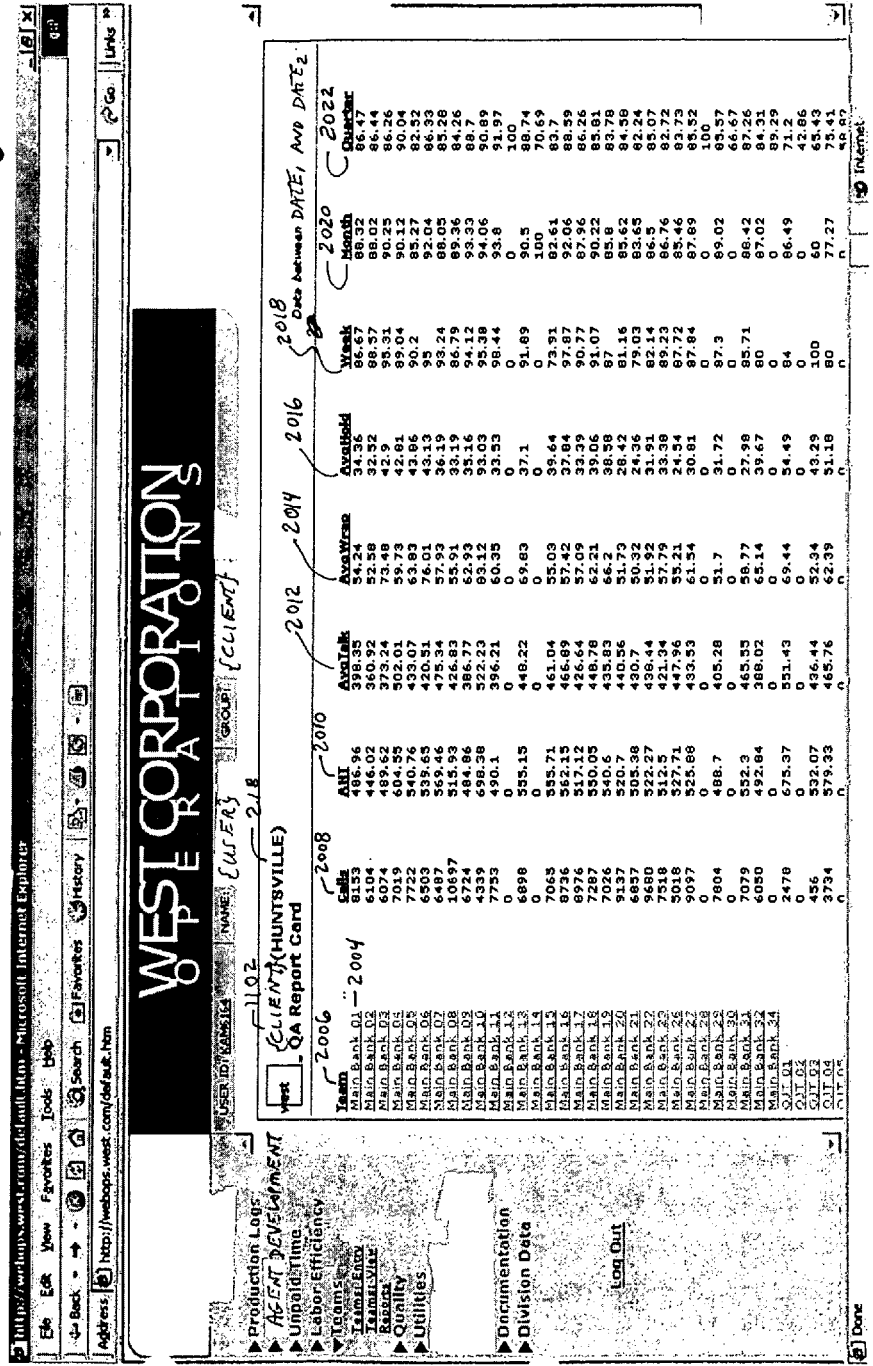
FIG. 20 is a screen shot of an illustrative but non-limiting embodiment of a report summarizing quality assurance (QA) parameters for several teams of agents.

FIG. 20 is a screen shot of an illustrative but non-limiting embodiment of a report 2000 summarizing quality assurance (QA) parameters for several teams of agents. As shown in this figure, this report 2000 can be arranged by client (field 1102)

and/or call center (field 218). A name or other identifier can appear under the "Team" column 2006, a total number of calls handled by each team can appear under the "Calls" column 2008, an average AHT parameter for the team can appear under the "AHT" column 2010, an average talk time parameter for the team can appear under the "AvgTalk" column 2012, a average call-wrap time parameter for the team can appear under the "AvgWrap" column 2014, and an average call-hold time parameter for the team can appear under the "AvgHold" column 2016. In the columns for week, month, and quarter, (columns 2018, 2029, and 2022) respective entries list the ratio of "Evals" to "Meets" (see FIGS. 18 and 19, columns 1824 and 1826) for the given week, month, and quarter. This ratio expresses the percentage of evaluations that resulted in a one-on-one meeting between the agent and a supervisor. In the illustrative but non-limiting embodiment of the report 2000 shown in FIG. 20, the entries under the "Team" column can be made hyperlinks, such that a user can access statistics specific to a given team by clicking on that team's name. In a sense, the report 2000 serves as a "report card" listing QA parameters for each team supporting a given client (for example, link 2004), or each team operating out of one or more call centers.

FIG. 21 is a screen shot of an illustrative but non-limiting embodiment of a report 2100 similar to that shown in FIG. 20, but listing QA-related parameters for one selected team of agents listed in the report 2000 shown in FIG. 20. A user may reach the report 2100 by, for example, clicking on link 2004 in FIG. 20. Area 2102 in FIG. 21 then displays statistics specific to the selected team, with area 2002 containing the overall QA report card shown in FIG. 20. Note also that entries under the "Id" column in area can be made hyperlinks, such that a user can access data on a specific agent by clicking a link corresponding to the agent, such as link 2104.

FIG. 22 is a screen shot of an illustrative but non-limiting embodiment of a report 2200 that is similar to the report 2100 shown in FIG. 21, but listing QA-related parameters for a specific agent who is listed in the report 2100. A user may reach the report 2200 by, for example, clicking on link 2104 in FIG. 21. The report 2200 includes an area 2202 displaying statistics for the specific selected agent, and the area 2102 from FIG. 21 can be displayed in conjunction with area 2202.

Figure 23:
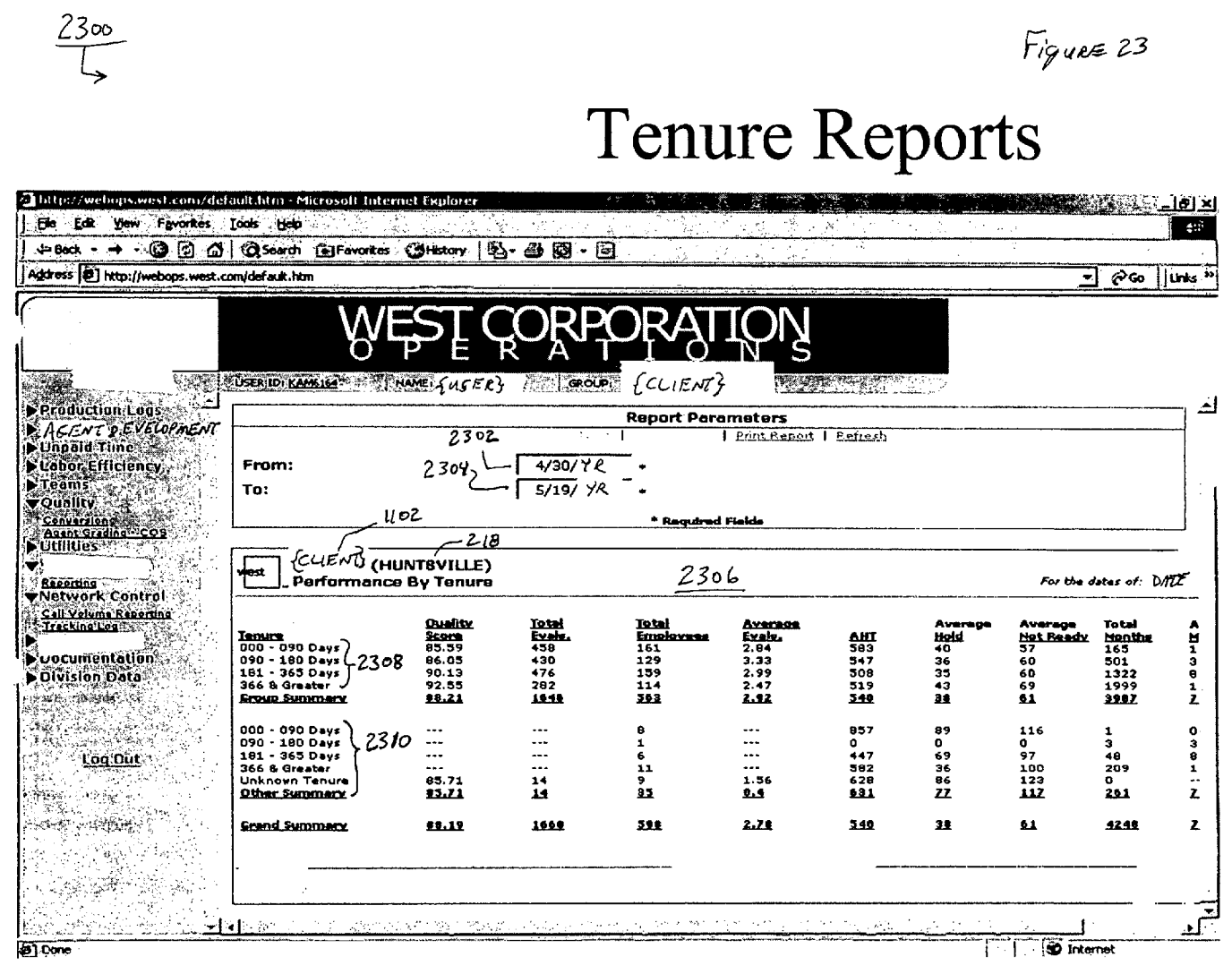

FIG. 23 is a screen shot of an illustrative but non-limiting embodiment of a report 2300 listing agent performance by tenure. This embodiment can display the client (field 1102) and/or the call center (field 218) for which the report 2300 is generated, that is the report 2300 will display data relating to those agents working at a given call center and/or servicing a given client. Fields 2302 and 2304 allow the user to specify start and end dates that serve as the boundaries for a query that extracts the raw data supporting the statistics shown in area 2306. Area 2306 can include first area 2308 and second area 2310. Area 2308 reports statistics for the agents serving the given client at the given call center, while area 2310 reports statistics for the agents in On the Job Training (OJT). In either case, these statistics can be reported by respective periods of tenure, such as the illustrative but non-limiting tenure periods of 0-90 days, 90-180 days, 180-365 days, and 366 and greater. The specific statistics reported can include one or more of the illustrative parameters shown in field 2306, or can include other parameters as deemed appropriate by management.

Figure 24:
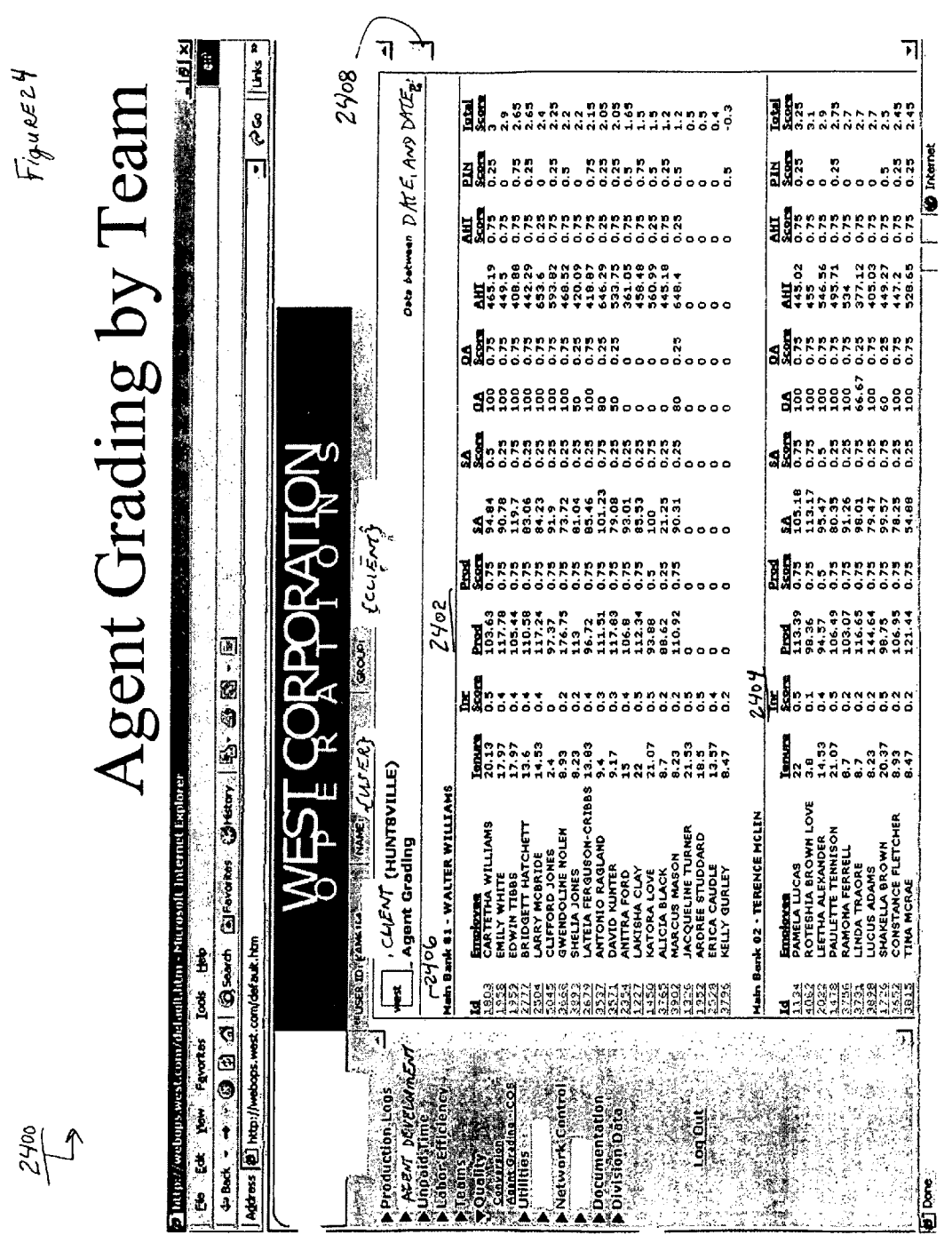

FIG. 24 is a screen shot of an illustrative but non-limiting embodiment of a report 2400 that lists agent grades, with the listing being organized by teams to which the agents are assigned or with which the agents are otherwise associated. As shown in this figure, this report 2400 can be arranged by team (field 2406), client (field 1102), and/or call center (field 218). Respective areas within the report 2400 display data for each team, such as areas 2402 for team "Main Bank 01" and area 2404 for team "Main Bank 02". Within each team's listing, the report 2400 displays statistics for each individual member of the team. In the illustrative but non-limiting embodiment shown in FIG. 24, respective columns can list each agent's ID, name, tenure, Tnr Score (which is an arbitrary score associated with respective values of Tenure, such that someone with 20.13 months of tenure receives 0.5 points while someone with 17.97 months of tenure receives a 0.4 score), a productivity parameter (which is net ACD/Net Payroll Time), SA (Schedule Adherence), QA Score (which is an arbitrary score assigned to respective values of QA, which in turn is the average of all Quality Assurance Evaluations), an average call handling time (AHT) parameter, an AHT score, a PIN score, and a total score. The PIN Score is a score assigned to each agent that shows whether the agent has a received a PIN. The Total Score is an average of all the scores assigned to the different quality-related metrics. This average can be a weighted average computed based on inputs from the user indicating the desired weighting of each of the different quality-related metrics. As non-limiting examples the user can input that SA be weighted 100% and nothing else is considered for grading purposes, or the user can input that SA is 25%, Prod is 25%, etc.

Note that in the illustrative but non-limiting embodiment shown in FIG. 24, the entries under the "Id" column in area can be made hyperlinks, such that a user can access data on a specific agent by clicking a link corresponding to the agent, such as link 2406. The report 2400 enables management or other supervisory personnel quickly to peruse the rosters for each team and quickly identify the top and bottom performers in each team. Note also that the team rosters shown in areas 2402 and 2404 are sorted by the Total Score column in descending order, such that the top performers appear first. Those skilled in the art will recognize that the report 2400 could utilize other sort fields and other sort orders, and further that the various columns illustrated in FIG. 24 could be altered, with other parameters being added or others being deleted, without departing from the scope of the invention. Further, in the interests of clarity, FIG. 24 illustrates two areas 2402 and 2404 to conserve space. However, other embodiments of the invention as shown in FIG. 24 can include reporting for any number of teams, with known GUI devices such as the scroll bar used to facilitate viewing any number of areas such as 2402 and 2404.

FIG. 25 is a screen shot of an illustrative but non-limiting embodiment of a report 2500 similar to the report 2400 shown in FIG. 24, but with the report 2500 listing grades for all agents associated with a given call center site. The report 2500 displays aggregate scores for all agents, regardless of which client, product, or application they may be supporting. The embodiment of the report 2500 as shown in FIG. 25 sorts the agents in descending order by the column "Total Score", such that the highest-performing agents appear at the top of the report 2500. However, those skilled in the art could employ any number of sort fields or sort orders, as well as adding other parameters to the report 2500, or modifying or deleting one or more of the parameters shown in FIG. 25. As discussed elsewhere in this application, a column such as the ID column can contain a series of hyperlinks, that a user may click to access employee-specific data.

A suitable application program can implement software residing on the computer-readable medium or media executable, for example on processing unit 2802, and embodying the various aspects of the invention as described herein and shown in the drawing figures, and can be coded using any suitable programming or scripting language. However, it is to be understood that the invention as described herein is not dependent on any particular operating system, environment, or programming language. Illustrative operating systems include without limitation LINUX, UNIX, or any of the Windows™-family of operating systems, and illustrative languages include without limitation a variety of structured and object-oriented languages such as C, C++, Visual Basic, or the like.

As those skilled in the art will understand, the program of instructions can be loaded and stored onto a program storage medium or device 30 (see FIG. 1) readable by a computer or other machine, for example processing unit 2802, embodying a program of instructions executable by the machine to perform the various aspects of the invention as discussed and claimed herein, and as illustrated in the drawing figures. Generally speaking, the program storage medium can be implemented using any technology based upon materials having specific magnetic, optical, semiconductor or other properties that render them suitable for storing computer-readable data, whether such technology involves either volatile or non-volatile storage media. Specific examples of such media can include, but are not limited to, magnetic hard or floppy disks drives, optical drives or CD-ROMs, and any memory technology based on semiconductors or other materials, whether implemented as read-only or random access memory. In short, this embodiment of the invention may reside either on a medium directly addressable by the computer's processor (main memory, however implemented) or on a medium indirectly accessible to the processor (secondary storage media such as hard disk drives, tape drives, CD-ROM drives, floppy drives, or the like). Consistent with the above teaching, program storage device can be affixed permanently or removably to a bay, socket, connector, or other hardware provided by the cabinet, motherboard, or other component of a given computer system.

Those skilled in the art will also understand that a computer programmed in accordance with the above teaching using known programming languages provides suitable means for realizing the various functions, methods, and processes as described and claimed herein and as illustrated in the drawing figure attached hereto.

Those skilled in the art, when reading this description, will understand that unless expressly stated to the contrary, the use of the singular or the plural number herein is illustrative, rather than limiting, of the instant invention. Accordingly, where a given term is discussed in the singular number, it will be well understood that the invention also contemplates a plural number of the item corresponding to the given term and vice versa, unless expressly stated herein to the contrary.

Various embodiments of the invention are described above to facilitate a thorough understanding of various aspects of the invention. However, these embodiments are to be understood as illustrative rather than limiting in nature, and those skilled in the art will recognize that various modifications or extensions of these embodiments will fall within the scope of the invention, which is defined by the appended claims. Specifically, various data stores are shown herein as separate entities for convenience and clarity of description herein, but the data stores as shown herein could be combined or separated in a given application without departing from the scope of the invention. Further, the various screen shots included herein depict illustrative rather than limiting or exclusive embodiments of the reports or other outputs possible under the invention. More particularly, the content, layout, and formatting of the various data shown on these screen shots could be altered or modified, certain data could be added or deleted to these screen shots without departing from the scope of the invention.

I claim:

1. A method of measuring performance parameters and reporting on at least one aspect of respective performance parameters of a plurality of agents, the method comprising at least the following:

measuring in an agent training system at least a plurality of data, including data representing agent performance parameters for each of the plurality, of agents, wherein the plurality of data representing agent performance parameters includes data related to at least one of either sections or teams to which an agent is assigned or associated, personal development meetings (PDMs) during which the agent receives constructive criticism or other remedial instruction related to improving job performance, wherein the plurality of data is related to improving the job performance of at least one of the plurality of agents on an individual agent-basis or a group-level agent-basis;

receiving from the agent training system the plurality of data from a first input representing respective performance parameters pertaining to the plurality of agents on the individual agent-basis or the group-level agent-basis working at least one call center;

organizing the at least plurality of data related to improving the job performance received from the first input in a data store in at least one of a plurality of user-specified parameters;

storing the at least plurality of data related to improving the job performance received from the first input in the data store arranged in at least one of the plurality of user-specified parameters for subsequent query and retrieval;

receiving at least one query of the data store by a user pertaining to the improving job performance of at least one of the agents on the individual agent-basis or the group-level agent-basis;

processing an output determined by the at least first input of at least the plurality of the data related to the improving job performance in response to the query and processing the output results in the plurality of data related to remedial instruction related to improving a job performance arranged in one of the plurality of user-specified parameters, including at least one of a productivity parameter, a conversion parameter, a schedule adherence parameter, and a number of calls parameter by a given agent; and presenting at least one report as determined by the output of the query to the at least one user.

2. The method of claim 1, wherein receiving data includes receiving production data.

3. The method of claim 1, wherein receiving data includes receiving data from at least one agent development system.

4. The method of claim 1, wherein receiving data includes receiving data representing at least one organizational structure associated with the plurality of agents on the individual agent-basis or the group-level agent-basis.

5. The method of claim 1, wherein receiving data includes receiving payroll data associated with at least one of the agents.

6. The method of claim 1, wherein receiving data includes receiving timekeeping data associated with at least one of the agents.

7. The method of claim 1, wherein receiving data includes receiving data from at least one call routing system.

8. The method of claim 1, wherein receiving data includes receiving human resources data associated with at least one of the agents.

9. The method of claim 1, wherein receiving data includes receiving data representing at least one appraisal issued to respective ones of the plurality of agents on individual agent-basis or the group-level agent-basis.

10. The method of claim 1, wherein receiving data includes receiving data from at least one automatic call distributor configured to route calls to the plurality of agents on the individual agent-basis or the group-level agent-basis.

11. The method of claim 1, wherein receiving data includes receiving data from at least one call processing platform.

12. The method of claim 1, wherein receiving data includes receiving data from at least one computer-based system serving as at least one call processing platform.

13. The method of claim 1, wherein receiving data includes receiving data from at least one system used to schedule the agents.

14. The method of claim 1, wherein receiving data includes receiving data from at least one system used to monitor attendance of the agents.

15. The method of claim 1, wherein receiving data includes receiving data indicating compliance by the agents with at least one predefined script.

16. The method of claim 1, wherein receiving data includes receiving client conversion data.

17. The method of claim 1, wherein storing the data includes storing the data into at least one relational database.

18. The method of claim 1, wherein storing the data includes storing the data into at least one object-oriented database.

19. The method of claim 1, wherein receiving data includes receiving data from a plurality of call centers, each of which service a plurality of clients.

20. The method of claim 1, wherein receiving data includes receiving data from a plurality of call centers, each of which service least one client.

21. The method of claim 1, wherein receiving data includes receiving data from a plurality of call centers, at least one of which service a given client.

22. The method of claim 1, wherein receiving data includes receiving data representing at least one administrative task performed by the agents.

23. The method of claim 1, wherein receiving data includes receiving data indicating at least one agent working overtime.

24. The method of claim 1, wherein receiving data includes receiving data pertaining to a plurality of agents, all of which agents render services to a given client.

25. The method of claim 1, wherein receiving data includes receiving data pertaining to a plurality of respective agents, all of which respective agents provide services to a plurality of clients.

26. The method of claim 1, wherein receiving at least one query includes receiving at least one query from at least one live user.

27. The method of claim 1, wherein receiving at least one query includes receiving at least one query from at least one automated process.

28. The method of claim 1, wherein receiving at least one query includes receiving at least one query from a management entity.

29. The method of claim 1, wherein receiving at least one query includes receiving at least one query seeking production log data.

30. The method of claim 1, wherein receiving at least one query includes receiving at least one query for data related to agent development.

31. The method of claim 1, wherein receiving at least one query includes receiving at least one query for time log data.

32. The method of claim 1, wherein receiving at least one query includes receiving at least one query relating to at least one user-defined group of agents.

33. The method of claim 1, wherein receiving at least one query includes receiving at least one query relating to at least one group of agents that is defined on an ad hoc basis.

34. The method of claim 1, wherein receiving at least one query includes receiving at least one query for at least one excused time report.

35. The method of claim 1, wherein receiving at least one query includes receiving at least one query for at least one time percentage report.

36. The method of claim 1, wherein receiving at least one query includes receiving at least one query for data related to at least one agent development system.

37. The method of claim 1, wherein receiving at least one query includes receiving at least one query for data for at least one specific agent who is participating in at least one agent development program.

38. The method of claim 1, wherein receiving at least one query includes receiving at least one query for at least one performance summary data pertaining to at least one specific agent.

39. The method of claim 1, wherein receiving at least one query includes receiving at least one query for at least one report providing agent productivity summary data.

40. The method of claim 1, wherein receiving at least one query includes receiving a query for agent productivity data, the agent productivity data being specific to at least one given date.

41. The method of claim 1, wherein receiving at least one query includes receiving at least one query for at least one efficiency report.

42. The method of claim 1, wherein receiving at least one query includes receiving at least one query for at least one efficiency report tailored to at least one specific call center.

43. The method of claim 1, wherein receiving at least one query includes receiving at least one query for an efficiency report tailored to a specific client serviced by a given call center.

44. The method of claim 1, wherein receiving at least one query includes receiving at least one query for at least one efficiency justification report.

45. The method of claim 1, wherein receiving at least one query includes receiving at least one query for at least one efficiency justification report tailored to at least one specific call center.

46. The method of claim 1, wherein receiving at least one query includes receiving at least one query for at least one efficiency justification report tailored to a specific client supported by at least one specific call center.

47. The method of claim 1, wherein receiving at least one query includes receiving at least one query for at least one report identifying at least one agent whose performance falls below at least one minimum threshold.

48. The method of claim 1, wherein receiving at least one query includes receiving at least one query for specific information pertaining to a specific agent whose performance falls below a minimum threshold.

49. The method of claim 1, wherein receiving at least one query includes receiving at least one query for a schedule adherence report.

50. The method of claim 1, wherein receiving at least one query includes receiving at least one query for a schedule adherence report tailored to at least one specific call center.

51. The method of claim 1, wherein receiving at least one query includes receiving at least one query for a schedule adherence report tailored to at least one specific client serviced by a call center.

52. The method of claim 1, wherein receiving at least one query includes receiving at least one query for a schedule adherence report that lists schedule adherence data for a plurality of respective agents.

53. The method of claim 1, wherein receiving at least one query includes receiving at least one query for specific schedule adherence information for a specific agent.

54. The method of claim 1, wherein receiving at least one query includes receiving at least one query for data related to at least one group of agents.

55. The method of claim 1, wherein receiving at least one query includes receiving at least one query for data pertaining to a specific team of agents.

56. The method of claim 1, wherein receiving at least one query includes receiving at least one query for data pertaining to a specific member of a specific group of agents.

57. The method of claim 1, wherein receiving at least one query includes receiving at least one query for a report containing quality analysis data pertaining to a plurality of respective groups of agents.

58. The method of claim 1, wherein receiving at least one query includes receiving at least one query for quality analysis data pertaining to at least one specific group out of a plurality of respective groups of agents.

59. The method of claim 1, wherein receiving at least one query includes receiving at least one query for quality analysis data pertaining to one specific member of one specific group out of a plurality of groups of agents.

60. The method of claim 1, wherein receiving at least one query includes receiving at least one query for at least one tenure report.

61. The method of claim 1, wherein receiving at least one query includes receiving at least one query for at least one tenure report tailored to agents working for a specific call center.

62. The method of claim 1, wherein receiving at least one query includes receiving at least one query for a tenure report tailored to agents working for one specific client.

63. The method of claim 1, wherein receiving at least one query includes receiving at least one query for at least one tenure report that lists performance data pertaining to a plurality of agents, wherein the at least one tenure report is organized by a plurality of tenure periods of the agents.

64. The method of claim 1, wherein receiving at least one query includes receiving at least one query for a report listing a plurality of grades for respective agents who are members of at least one respective group of agents.

65. The method of claim 1, wherein receiving at least one query includes receiving at least one query for at least one report providing respective grades for a plurality of respective agents.

66. The method of claim 1, wherein receiving at least one query includes receiving at least one query for at least one report listing respective grades for a plurality of respective agents on the individual agent-basis or the group-level agent-basis, all of which agents work at one given call center.

67. The method of claim 1, wherein receiving at least one query includes receiving at least one query for at least one report listing respective grades for a plurality of respective agents on the individual agent-basis or the group-level agent-basis, all of which agents support one given client.

68. The method of claim 1, wherein receiving at least one query includes receiving at least one query for performance information for at least one respective agent reported based upon at least one human resources interviewer associated with the at least one agent.

69. The method of claim 1, wherein receiving at least one query includes receiving at least one query for performance-related data for at least one agent reported based upon at least one trainer associated with the agent.

70. The method of claim 1, wherein receiving at least one query includes receiving at least one query for performance-related data for at least one agent reported based upon at least one supervisor associated with the at least one agent.

71. The method of claim 1, wherein receiving at least one query includes receiving at least one query for performance-related data for at least one agent reported based upon at least one manager associated with at least one agent.

72. The method of claim 1, wherein receiving at least one query includes receiving at least one query for performance-related data of at least one agent reported based upon a date on which the at least one agent began on the job training.

73. The method of claim 1, wherein receiving at least one query includes receiving at least one query for performance-related data for at least one agent reported based upon a date on which the at least one agent ended on the job training.

74. The method of claim 1, wherein presenting at least one report of the query includes presenting at least one report related to at least one agent development system, displaying data for the plurality of agents, wherein at least one field of the at least one report is responsive to user input to display data specific to at least one selected agent.

75. The method of claim 1, wherein presenting at least one report of the query includes presenting at least one report related to an agent development system displaying data for at least one agent, wherein at least one field of the at least one report is responsive to user input to display data specific to the at least one selected agent.

76. The method of claim 75, wherein displaying at least one report includes displaying at least one report having at least one field that is responsive to user input to display data specific to at least one appraisal received by the at least one selected agent.

77. The method of claim 75, wherein displaying at least one report includes displaying at least one report having at least one field that is responsive to user input to display data specific to at least one personal improvement meeting received by the at least one selected agent.

78. The method of claim 75, wherein presenting at least one report includes presenting at least one report that is including at least one field responsive to user input to display agent productivity summary data pertaining to a predefined time period.

79. The method of claim 78, wherein presenting the at least one report includes presenting the at least one report having at least one field that is responsive to user input to display agent productivity data relating to at least one specific day worked by the at least one selected agent, wherein the at least one report includes at least one field responsive to user input to display data specific to at least one selected agent.

80. The method of claim 1, wherein presenting the at least one report of the query includes presenting at least one report indicating at least one agent who's performance falls below at least one minimum threshold.

81. The method of claim 1, wherein presenting the at least one report of the query includes presenting at least one report containing schedule adherence data respective to a plurality of agents.

82. The method of claim 1, wherein presenting the at least one report of the query includes presenting at least one report containing schedule adherence data respective to a plurality of agents, wherein the report includes at least one field that is responsive to user input to display schedule adherence data specific to at least one selected agent.

83. The method of claim 1, wherein presenting the at least one report of the query includes presenting at least one report displaying performance data for a plurality of agents arranged into at least one group, wherein the report includes at least one field that is responsive to user input to display performance data specific to at least one selected agent.

84. The method of claim 1, wherein presenting the at least one report of the query includes displaying at least one report indicating respective performance data for each one of a plurality of groups of agents, wherein the report includes at least one field that is responsive to user input to display performance data specific to at least one selected group of agents.

85. The method of claim 84, wherein the report includes at least one field that is responsive to user input to display data specific to at least one selected agent.

86. The method of claim 85, wherein the displayed data is quality analysis "QA" data.

87. At least one program storage device readable by at least one machine, tangibly embodying a program of instructions executable by the at least one machine to perform a method of measuring performance parameters and reporting on at least one aspect of respective performance parameters of a plurality of agents, the method comprising at least the following:

measuring in an agent training system at least a plurality of data, including data representing agent performance parameters for each of the plurality of agents, wherein the plurality of data representing agent performance parameters includes data related to at least one of either sections or teams to which an agent is assigned or associated, personal development meetings (PDMs) during which the agent receives constructive criticism or other remedial instruction related to improving job performance, wherein the plurality of data is related to improving the job performance of at least one of the plurality of agents on an individual agent-basis or a group-level agent-basis;

receiving from the agent training system the plurality of data from a first input representing respective performance parameters pertaining to the plurality of agents on the individual agent-basis or the group-level agent-basis working at least one call center;

organizing the at least plurality of data related to improving the job performance received from the first input in a data store in at least one of a plurality of user-specified parameters;

storing the at least plurality of data related to improving the job performance received from the first input in the data store arranged in at least one of the plurality of user-specified parameters for subsequent query and retrieval;

receiving at least one query of the data store by a user pertaining to the improving job performance of at least one of the agents on the individual agent-basis or the group-level agent-basis;

processing an output determined by the at least first input of at least-the plurality of the data related to the improving job performance in response to the query and processing the output results in the plurality of data related to remedial instruction related to improving a job performance arranged in one of the plurality of user-specified parameters, including at least one of a productivity parameter, a conversion parameter, a schedule adherence parameter, and a number of calls parameter by a given agent; and presenting at least one report as determined by the output of the query to the at least one user.

88. A system for measuring performance parameters and reporting on at least one aspect of respective performance parameters of a plurality of agents, the system comprising at least the following:

an agent training system comprising means for measuring at least a plurality of data from a first input representing respective performance parameters pertaining to the plurality of agents, wherein the plurality of data representing performance parameters includes data related to at least one of either sections or teams to which an agent is assigned or associated, personal development meetings (PDMs), during which the agent receives constructive criticism or other remedial instruction related to improving job performance, wherein the plurality of data is related to improving job performance of at least one of the plurality of agents on an individual agent-basis or a group-level agent-basis working at least in one call center;

means for organizing the at least plurality of data related to improving the job performance of at least one of the agents on the individual agent-basis or the group-level agent-basis in a data store arranged in at least one of the plurality of specified parameters;

means for storing the at least plurality of data received from the first input in a data store for subsequent query and retrieval;

means for receiving at least one query pertaining to the improving job performance of the at least one of the agents on the individual agent-basis or the group-level agent-basis;

means for processing at least some of the at least plurality of data as output data in response to a query by a user and determined by the input data and the processing results in the plurality of output data arranged in one of the plurality of specified parameters; and means for presenting at least one report as determined by the output data arranged in one of the plurality & specified parameters, including at least one of a productivity parameter, a conversion parameter, a schedule adherence parameter, and a number of calls parameter by a given agent, of the query to the at least one user.

* * * * *